(12) United States Patent
Janik et al.

(10) Patent No.: US 10,172,035 B2
(45) Date of Patent: Jan. 1, 2019

(54) STORAGE AND PLAYBACK DEVICE AND METHOD FOR USING THE SAME

(75) Inventors: Craig M. Janik, Los Altos Hills, CA (US); Nick Kalayjian, San Francisco, CA (US); Bruce Edwards, Burlingame, CA (US)

(73) Assignee: Callahan Cellular L.L.C., Wilmington, DE (US)

( * ) Notice: Subject to any disclaimer, the term of this patent is extended or adjusted under 35 U.S.C. 154(b) by 1514 days.

(21) Appl. No.: 13/011,285

(22) Filed: Jan. 21, 2011

(65) Prior Publication Data

US 2011/0178616 A1 Jul. 21, 2011

Related U.S. Application Data

(60) Division of application No. 11/717,430, filed on Mar. 13, 2007, now Pat. No. 7,920,824, which is a
(Continued)

(51) Int. Cl.
*H04W 28/06* (2009.01)
*G11B 27/10* (2006.01)
(Continued)

(52) U.S. Cl.
CPC ............ *H04W 28/06* (2013.01); *G11B 27/10* (2013.01); *G11B 27/34* (2013.01); *H04L 29/06* (2013.01);
(Continued)

(58) Field of Classification Search
CPC .... H04W 64/00; H04W 4/02; H04L 29/08657
(Continued)

(56) References Cited

U.S. PATENT DOCUMENTS 5,214,792 A * 5/1993 Alwadish ..................... 455/45
5,374,802 A 12/1994 Dorfman et al.
(Continued)

FOREIGN PATENT DOCUMENTS

EP 0 992 921 4/2000
EP 0 909 112 1/2004
(Continued)

OTHER PUBLICATIONS

The ForeFront Group, Inc.: "ForeFront WebWhacker Version 3.0 Reference Guide (Windows 95/NT)," Dec. 1, 1997. Retrieved from the Internet on May 2, 2011: URL: http://replay.web.archive.org/20001003150051/http://www.bluesquirrel.com/support/whacker/doc_cpg_ww3_win95.zip, 122 pages.
(Continued)

*Primary Examiner* — Ankur Jain
(74) *Attorney, Agent, or Firm* — Foley & Lardner LLP

(57) ABSTRACT

A storage and playback device is capable of being detachably coupled to an output device, such as speakers of an automobile. The device includes a wireless transceiver to receive compressed digital content automatically from a computer system via a wireless local area network based on user defined preferences input into the computer system. The wireless transceiver is communicably coupled to the wireless local area network when the wireless transceiver is a predetermined distance from a wireless local area network access point. The device also includes a decoder and converter to decompress and convert the digital content. The decompressed and converted digital content is sent to be played on the output device.

32 Claims, 21 Drawing Sheets

Related U.S. Application Data continuation of application No. 10/052,057, filed on Oct. 19, 2001, now Pat. No. 7,200,357.

(60) Provisional application No. 60/242,049, filed on Oct. 20, 2000.

(51) Int. Cl.

| | | |
|---|---|---|
| *G11B 27/34* | (2006.01) | |
| *H04L 29/06* | (2006.01) | |
| *H04W 4/02* | (2018.01) | |
| *H04W 4/20* | (2018.01) | |
| *H04L 29/08* | (2006.01) | |
| *H04W 4/00* | (2018.01) | |
| *H04W 4/18* | (2009.01) | |
| *H04W 28/18* | (2009.01) | |
| *H04W 84/12* | (2009.01) | |
| *H04W 88/08* | (2009.01) | |

(52) U.S. Cl.
CPC .......... *H04L 65/604* (2013.01); *H04L 67/12* (2013.01); *H04L 67/18* (2013.01); *H04L 67/306* (2013.01); *H04W 4/02* (2013.01); *H04W 4/20* (2013.01); *H04L 29/06027* (2013.01); *H04L 67/2823* (2013.01); *H04L 69/329* (2013.01); *H04W 4/00* (2013.01); *H04W 4/18* (2013.01); *H04W 28/18* (2013.01); *H04W 84/12* (2013.01); *H04W 88/08* (2013.01)

(58) Field of Classification Search
USPC ............................. 455/456.1, 3.02; 375/219
See application file for complete search history.

(56) References Cited

U.S. PATENT DOCUMENTS

| | | | |
|---|---|---|---|
| 5,434,860 A | | 7/1995 | Riddle |
| 5,572,442 A | | 11/1996 | Schulhof et al. |
| 5,703,734 A * | | 12/1997 | Berberich et al. ......... 360/99.18 |
| 5,721,827 A | | 2/1998 | Logan et al. |
| 5,724,567 A | | 3/1998 | Rose et al. |
| 5,742,599 A | | 4/1998 | Lin et al. |
| 5,758,257 A | | 5/1998 | Herz et al. |
| 5,790,935 A | | 8/1998 | Payton |
| 5,793,980 A | | 8/1998 | Glaser |
| 5,884,028 A | | 3/1999 | Kindell et al. |
| 5,923,624 A * | | 7/1999 | Groeger et al. ................. 369/7 |
| 5,926,624 A | | 7/1999 | Katz et al. |
| 5,991,306 A | | 11/1999 | Burns et al. |
| 6,005,566 A | | 12/1999 | Jones et al. |
| 6,009,355 A * | | 12/1999 | Obradovich et al. .............. 701/1 |
| 6,016,520 A * | | 1/2000 | Facq et al. ....................... 710/33 |
| 6,055,566 A * | | 4/2000 | Kikinis ........................... 709/219 |
| 6,088,730 A * | | 7/2000 | Kato et al. ...................... 709/227 |
| 6,108,706 A * | | 8/2000 | Birdwell et al. ............... 709/229 |
| 6,263,503 B1 | | 7/2001 | Margulis |
| 6,314,094 B1 * | | 11/2001 | Boys ............................... 370/352 |
| 6,324,054 B1 * | | 11/2001 | Chee et al. ............... 361/679.34 |
| 6,374,177 B1 * | | 4/2002 | Lee et al. ....................... 701/516 |
| 6,389,337 B1 * | | 5/2002 | Kolls ........................... 701/31.6 |
| 6,408,232 B1 * | | 6/2002 | Cannon et al. ............... 701/32.4 |
| 6,434,187 B1 * | | 8/2002 | Beard et al. ................... 375/219 |
| 6,434,747 B1 | | 8/2002 | Khoo et al. |
| 6,452,910 B1 * | | 9/2002 | Vij et al. ....................... 370/310 |
| 6,453,355 B1 | | 9/2002 | Jones et al. |
| 6,483,292 B2 * | | 11/2002 | Kochi ........................... 702/183 |
| 6,526,581 B1 | | 2/2003 | Edson |
| 6,542,794 B2 * | | 4/2003 | Obradovich ..................... 701/1 |
| 6,545,596 B1 * | | 4/2003 | Moon ..................... G08G 1/20 340/425.5 |
| 6,587,046 B2 * | | 7/2003 | Joao ............................. 340/539.14 |
| 6,678,215 B1 | | 1/2004 | Treyz et al. |
| 6,678,737 B1 | | 1/2004 | Bucher |
| 6,700,893 B1 | | 3/2004 | Radha et al. |
| 6,708,213 B1 | | 3/2004 | Bommaiah et al. |
| 6,711,474 B1 * | | 3/2004 | Treyz et al. ..................... 701/1 |
| 6,717,952 B2 | | 4/2004 | Jones et al. |
| 6,728,531 B1 * | | 4/2004 | Lee et al. ....................... 455/419 |
| 6,738,628 B1 * | | 5/2004 | McCall et al. ............. 455/456.1 |
| 6,744,763 B1 | | 6/2004 | Jones et al. |
| 6,826,283 B1 | | 11/2004 | Wheeler et al. |
| 6,829,648 B1 | | 12/2004 | Jones et al. |
| 6,968,364 B1 | | 11/2005 | Wong et al. |
| 7,072,932 B1 | | 7/2006 | Stahl |
| 7,117,516 B2 | | 10/2006 | Khoo et al. |
| 7,187,947 B1 * | | 3/2007 | White ........................ 455/556.1 |
| 7,191,242 B1 | | 3/2007 | Serenyi et al. |
| 7,200,357 B2 * | | 4/2007 | Janik et al. ................... 455/3.02 |
| 7,362,999 B2 * | | 4/2008 | Petschke et al. ............ 455/3.02 |
| 7,366,788 B2 | | 4/2008 | Jones et al. |
| 7,437,675 B2 * | | 10/2008 | Casati et al. .................. 715/736 |
| 7,451,177 B1 | | 11/2008 | Johnson et al. |
| 7,612,685 B2 * | | 11/2009 | Harris et al. .................... 340/4.2 |
| 7,634,228 B2 * | | 12/2009 | White et al. ................. 455/3.06 |
| 7,739,413 B2 * | | 6/2010 | Dewa et al. .................. 709/250 |
| 7,870,142 B2 * | | 1/2011 | Michmerhuizen et al. .. 707/755 |
| 8,055,899 B2 * | | 11/2011 | Levy ...................... G06F 21/10 705/57 |
| 8,099,403 B2 * | | 1/2012 | Levy ................. G06F 17/30067 707/705 |
| 8,416,067 B2 * | | 4/2013 | Davidson et al. ......... 340/426.1 |
| 8,874,475 B2 * | | 10/2014 | Betancourt ..................... 705/30 |
| 2002/0023002 A1 | | 2/2002 | Staehelin |
| 2002/0056112 A1 | | 5/2002 | Dureau et al. |
| 2002/0059603 A1 | | 5/2002 | Kelts |
| 2002/0194309 A1 * | | 12/2002 | Carter et al. ................. 709/219 |
| 2003/0045273 A1 | | 3/2003 | Pyhalammi et al. |

FOREIGN PATENT DOCUMENTS

| | | |
|---|---|---|
| WO | WO-99/18506 | 4/1999 |
| WO | WO-00/23899 | 4/2000 |
| WO | WO-00/49731 | 8/2000 |
| WO | WO-01/10124 | 2/2001 |
| WO | WO-01/47192 | 6/2001 |

OTHER PUBLICATIONS

Dudrow, Andrea: "WebWhacker gets update," Dec. 10, 1997, Retrieved from the Internet on May 2, 2011, URL: http://www.zdnet.com/news/webwhacker-gets-update/97828, 3 pages.

Examination Report on European Patent Application 01274307.6, dated May 16, 2011.

Kalakota, R., "Information Supply-Chains and Webcasting: A Design Framework," IEEE 1997 Fourth International Workshop on Community Network Proceedings, Sep. 11, 1997, pp. 103-111.

Cravotta, Nicholas, "The Internet audio (r)evolution," Feb. 3, 2000, pp. 101-110.

Degoulet, G. et al., "EPEOS—Automatic Program Recording System," Nov. 1975, 22 pgs.

Final Office Action on U.S. Appl. No. 10/052,057, dated Dec. 22, 2003.

Final Office Action on U.S. Appl. No. 10/052,057, dated Jul. 1, 2005.

Haartsen, Jaap, "Bluetooth—The universal radio interface for ad hoc, wireless connectivity," Ericsson Review No. 3, 1998, pp. 110-117.

International Preliminary Examination Report for PCT/US01/50991, completed Sep. 3, 2003.

International Search Report for PCT/US01/50991, dated Oct. 29, 2002.

Non-Final Office Action on U.S. Appl. No. 10/052,057, dated Oct. 4, 2004.

Non-Final Office Action on U.S. Appl. No. 10/052,057, dated Dec. 30, 2005.

Non-final Office Action on U.S. Appl. No. 10/052,057, dated May 1, 2003.

(56) References Cited

OTHER PUBLICATIONS

Non-Final Office Action on U.S. Appl. No. 10/052,057, dated May 24, 2004.
Non-Final Office Action on U.S. Appl. No. 10/052,057, dated Jun. 5, 2006.
Non-final Office Action on U.S. Appl. No. 11/717,430, dated Apr. 1, 2010.
Notice of Allowance on U.S. Appl. No. 10/052,057, dated Oct. 24, 2006.
Notice of Allowance on U.S. Appl. No. 11/717,430, dated Oct. 5, 2010.
Nusser, Rene et al., "Bluetooth-based Wireless Connectivity in an Automotive Environment," 2000, pp. 1935-1942.
Pauler, Herbert, "Copy Protection for MP3 Audio," pp. 54-57.
PR Newswire, "New Company Xenote Allows Consumers to 'Bookmark the Real World' with Fun, Personal Internet Device," Jan. 25, 2000, 2pgs.
Restriction Requirement on U.S. Appl. No. 11/717,430, dated Dec. 29, 2009.
Stirling, Andrew et al., "Mobile Multimedia Platforms," 2000, pp. 2541-2548.
Tivo, Inc., Form S-1, Jul. 22, 1999, 902 pgs.
Non-Final Office Action on U.S. Appl. No. 13/011,388, dated May 7, 2013.
Non-Final Office Action on U.S. Appl. No. 13/011,388, dated Sep. 17, 2013.

* cited by examiner

○Simple Browser

Tags ◄Back ►Forward ■Stop ⟳refresh ⌂home

Web Radio — 264

(bounce) (home)

○ Fresh Air n p r

| | |
|---|---|
| Radio Station: | NPR |
| Show Name: | Fresh Air |
| Show Topic: | Live |
| Show Description: | Terry Gross Interviews Armistead Maupin, creator of the award winning newspaper serial turned TV series Tales of the City, His first novel in eight years, The Night Listener (Harper Collins, 2000), is the topic of the October 3, 2000, interview. The novel examines the relationship that grows between a cult writer and one of his younger radio fans; critics have noted the autobiographical subtext to the story. Maupin won the 1998 Peabody Award for his work in television and has written several novels and two collections of essays. He lives in San Francisco. |
| Guest Information: | |
| Homepage: | Lorem Ipsum dolor sit amet, consetuer enim ad, quis nostrud... more... |

268 — ▯ send the latest Fresh Air show to my Auto Player everyday

BUY THIS CD
amazon.com
★★★★
Customer Rated

BUY TICKETS
exclusivemistor.com

— 246

Additional Info

My Computer

Simple ▼

FIG. 13

STORAGE AND PLAYBACK DEVICE AND METHOD FOR USING THE SAME

CROSS-REFERENCE TO RELATED PATENT APPLICATIONS

This application is a Division of U.S. patent application Ser. No. 11/717,430, filed Mar. 13, 2007, which is a Continuation of U.S. patent application Ser. No. 10/052,057, filed Oct. 19, 2001 (now U.S. Pat. No. 7,200,357), which claims priority to U.S. Provisional Patent Application No. 60/242,049, filed Oct. 20, 2000, each of which is incorporated herein by reference in its entirety.

FIELD OF INVENTION

The present invention relates generally to ubiquitous computing devices and, more particularly, to providing digital content from the Internet to a computing device.

BACKGROUND OF THE INVENTION

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Although the majority of household PC are connected to the Internet by dialup modem connections, broadband connectivity is being rapidly adopted and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission. that LAN data-rates are increasing much faster than wide-area (broadband) data-rates, such as the data-rates provided by "last mile" technologies including DSL, DOCSIS.

The availability of home networking technology and broadband proliferation brings with it the introduction of the residential gateway, a device that exists to connect a local area network or networks in the home, to the Internet. There are many types of gateways including DSL modems and cable modem. Digital cable set-top boxes are now being introduced with integral DOCSIS cable modem and hard disk drives. Other residential gateways have been introduced that include PC comparable processing power and hard disk drives, as well as cable and DSL modems, and LAN transceivers.

While networked PCs with Internet connectivity provide greater convenience for productivity applications, there are other trends that are influencing end user's content experiencing habits. Most notably, the digitization of virtually all media types is creating content portability and reusability that are affording new uses and content presentation scenarios. For example, Personal Video Recorders (hereafter PVRs) are increasing in popularity. These devices are an improvement on VCR "time-shifting" functionality, allowing users to record, pause, and start live broadcast media, almost in real time. These devices digitize terrestrially broadcast television content and store the files on a hard disk drive, providing much faster random access, fast-forwarding, and rewinding. A graphical user interface is provided that allows users to make content preference selections.

The MP3 digital audio format is an audio encoding technology that allows consumers to further compress digital audio files such as those found on Compact Disks, to much smaller sizes with very little loss in sound quality. For example, the MP3 format allows for compression of audio content to approximately 1 million bytes per minute of audio, at near Compact Disk quality. The smaller size of MP3 encoded audio files has enabled these files to be shared by users across the Internet, since the digital transfer of these files can be completed in a reasonable amount of time with a broadband connection. A variety of Internet-based digital music access and distribution services have appeared that provide means for users to gain access to digital audio files.

In addition to music, many other types of audio content are now available in digital format, such as spoken-word content, news, commentary, and educational content. Digital files containing audio recordings of books being read aloud are available for download via the Internet.

PC-based digital audio software players, such as WinAmp provided by AOL/TimeWarner, have been created that provide a convenient graphical user interface and software decoding of MP3 files. PC software digital audio players allow users to play MP3 files on their PC, using an existing sound card with external speakers. Software digital audio players typically include playlist editors, which are applications that allows users to organize their MP3 or other digital music files. Playlists are files that include names and file system path designations to file based digital audio files.

Users who amass a large quantity of digital audio files often have a desire to listen to those audio files at places other than at the PC. Portable MP3 playback devices have been developed for this purpose. Portable MP3 playback devices are significantly smaller than portable CD players because they contain no moving parts, only solid-state flash memory, a microprocessor for decoding MP3-formatted audio content, and batteries.

One limitation of portable MP3 playback devices is that the cost per bit of audio content stored is still very high because of the high cost of flash memory. The typical portable digital audio playback device includes enough flash memory to store about one CD's worth of digital music. MP3 enthusiasts may own hundreds or thousands of MP3 files. The result is that the user is burdened with having to continually manually change the music files in the device by plugging the device into the PC and operating a user interface to delete and add new music if they want to listen to a wide range of music.

Digital audio enthusiasts, as well as music enthusiasts in general, have a desire to listen to their audio collections in their automobiles. Evidence of this is the market success of automotive-based CD changers. Since user's typically do not purchase multiple copies of CDs, they must manually transport CDs between the automobile and home stereo system if they want to listen to the audio content at both locations.

Telematics is a field of technology that includes mobile, automobile-based telecommunications. Increasingly, automobiles include a variety of telematics equipment and capabilities, such as on-board cellular communications and navigation systems. However, due to the cost per bit of transmitted data, even in 2.5 G and 3 G systems, it is cost prohibitive to transfer large amounts of file-based content, such as audio or graphics files, to the automobile via the cellular system.

What is required is a system for automatically and conveniently transforms digital content to a device, such as one for use in connection with an automobile, where it can be stored and played back according to the user's preference. Additionally, the system should include a system for selecting content to be automatically delivered or refreshed at the device on a regular basis. The system should also allow users to access their music on the device by the use of the same playlist structure in the home.

SUMMARY OF THE INVENTION

A storage and playback device and method for using the same are described. The storage and playback device is, for example, capable of being detachably coupled to an automobile. The device includes a wireless transceiver to receive compressed digital content automatically from a computer system via a wireless local area network based on user defined preferences input into the computer system. The wireless transceiver is communicably coupled to the wireless local area network when the wireless transceiver is a predetermined distance from a wireless local area network access point. The device also includes a decoder and converter to decompress and convert the digital content. The decompressed and converted digital content is sent to be played on an output device associated with the device, for example the output device of an automobile.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only:

FIG. 13. illustrates an exemplary PC desktop with a graphical user interface of a content selection web page;

DETAILED DESCRIPTION OF THE PREFERRED EMBODIMENTS

Figure 1:
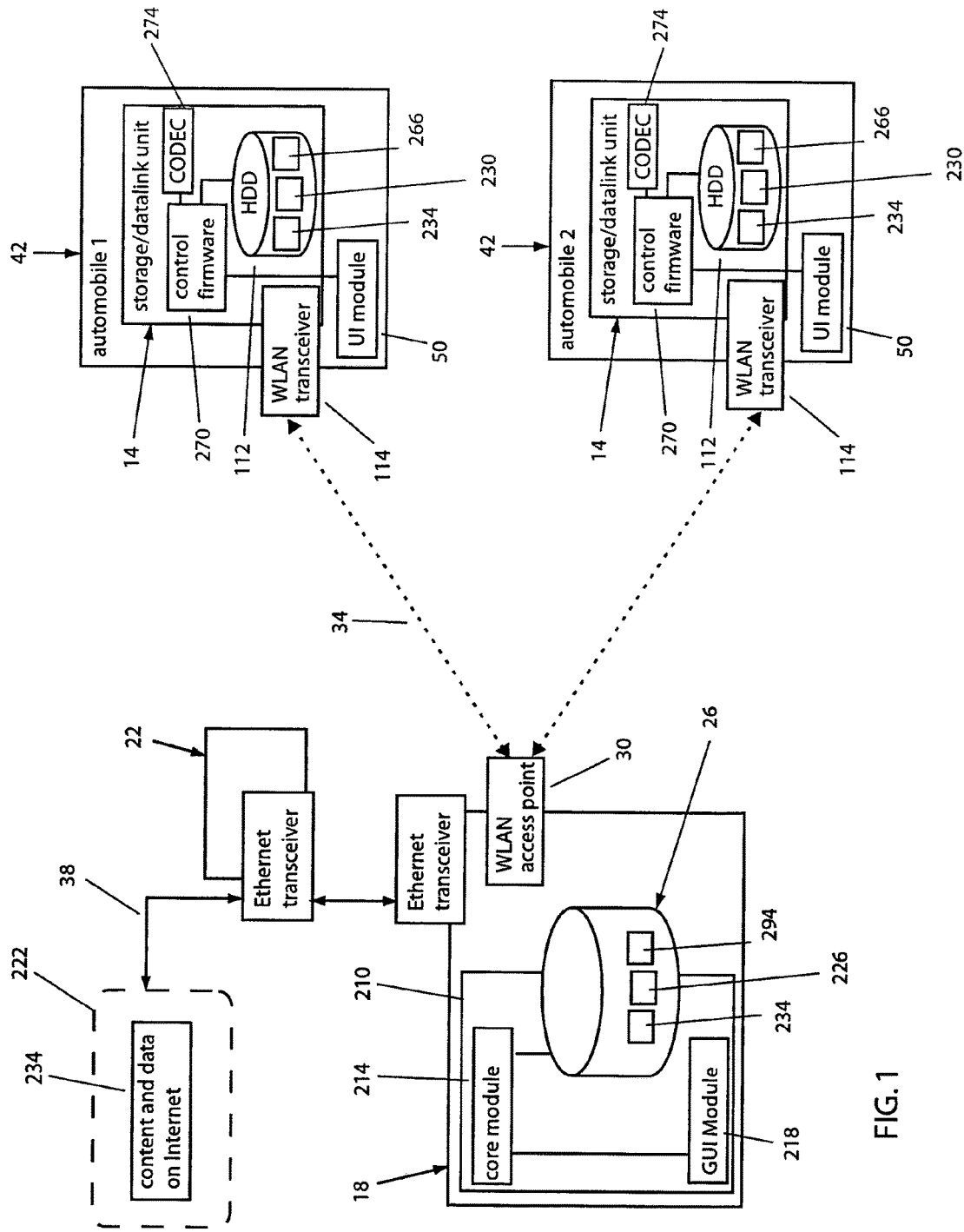
FIG. 1. illustrates is schematic block diagram of an exemplary LAN-based content delivery and playback system.

A storage and playback device and method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention:

The term "content" is used to refer to digital audio, video, images, or interactive multimedia.

A network is defined as two or more computer devices of any type, such as a personal computer (PC), network appliance, or PDA, connected together by a digital communication link. A device that has a communication link to the network is often referred to as a node. A local area network (LAN) is defined as a plurality of nodes connected by the network that are in physically close proximity.

The term gateway, used interchangeably with broadband gateway, is defined as an integral modem and router, and may include hub functionality. The modem (modulator/demodulator) function is used to change voltage fluctuations on an input carrier line (a DSL line input or a cable TV input) into digital data Routers are devices that connect one distinct network to another by passing only certain IP addresses that are targeted for specific networks. Hubs allow one network signal input to be split and thus sent to many devices.

A storage gateway or storage gateway system combines mass storage capability with a gateway. For example, a Personal Computer (PC) connected to a broadband cable modem gateway is considered a storage gateway system. A digital cable set-top box with DOCSIS cable modem and a hard disk drive is also considered to be a storage gateway system.

A CODEC, an acronym for "compression/decompression", is a software algorithm function implemented in software or software and hardware for compressing and decompressing audio, graphic, or moving picture data. For example, MP3 is a well-known CODEC format and is a naming convention for MPEG layer 3, which is the digital audio layer in an MPEG encoded video data file.

Subscription is defined to mean a content service whereby new content is periodically provided based on a content selection parameter, such as a particular artist, editorialist, or genre. Subscription services may be paid for by the user or can be ad-supported (free to the user). An example of a subscription service is a audio sports news file that is downloaded to a user's PC every day.

Providing now an overview of the system, the basic function is to provide a system for delivering digital file-based content to a device, for example one to be associated with an automobile, for playback by a user, and involves wireless communication and information (content) transfer between the Internet and home PC 18, and the local area network (LAN)-based storage and playback system 10. The content may be transferred automatically and periodically, and/or under the direct control of the user.

The system includes a broadband connection connected to a PC 18 with a wireless LAN access point 30, located in a residence or at a specific fixed site. There is a LAN-based storage and playback system 10, for example located in the automobile, that includes a computer system with a hard disk drive and a wireless LAN transceiver. Anytime the device is within range of the wireless LAN access point 30, the computer system in the device becomes a node on the wireless LAN, and content maybe transferred from the Internet and home PC 18. The content may be stored in the hard disk drive in the automobile. In terms of its placement into an automobile, in one embodiment, the storage and playback system 10 is schematically similar to systems incorporating multi-CD changers that are typically located in the trunk.

One embodiment of the present invention will be described first in terms of the hardware components of the system, then the software components. Finally, the operation of the system will be described. Alternative embodiments will also be described.

Referring now to FIG. 1, a schematic of the LAN-based content delivery system is shown. In one embodiment, a PC 18 located in the home is connected to the Internet via a broadband connection 38 using a DOCSIS cable modem 22, and comprises a storage gateway system PC 18 includes a hard disk drive 26 and a wireless LAN access point 30, which is connected to PC 18 via a USB connection. In one embodiment, wireless LAN technology based on the IEEE 802.11b specification is used. The wireless LAN 30 system described uses socket-based communication protocols, specifically the TCP/IP standard.

Figure 2:
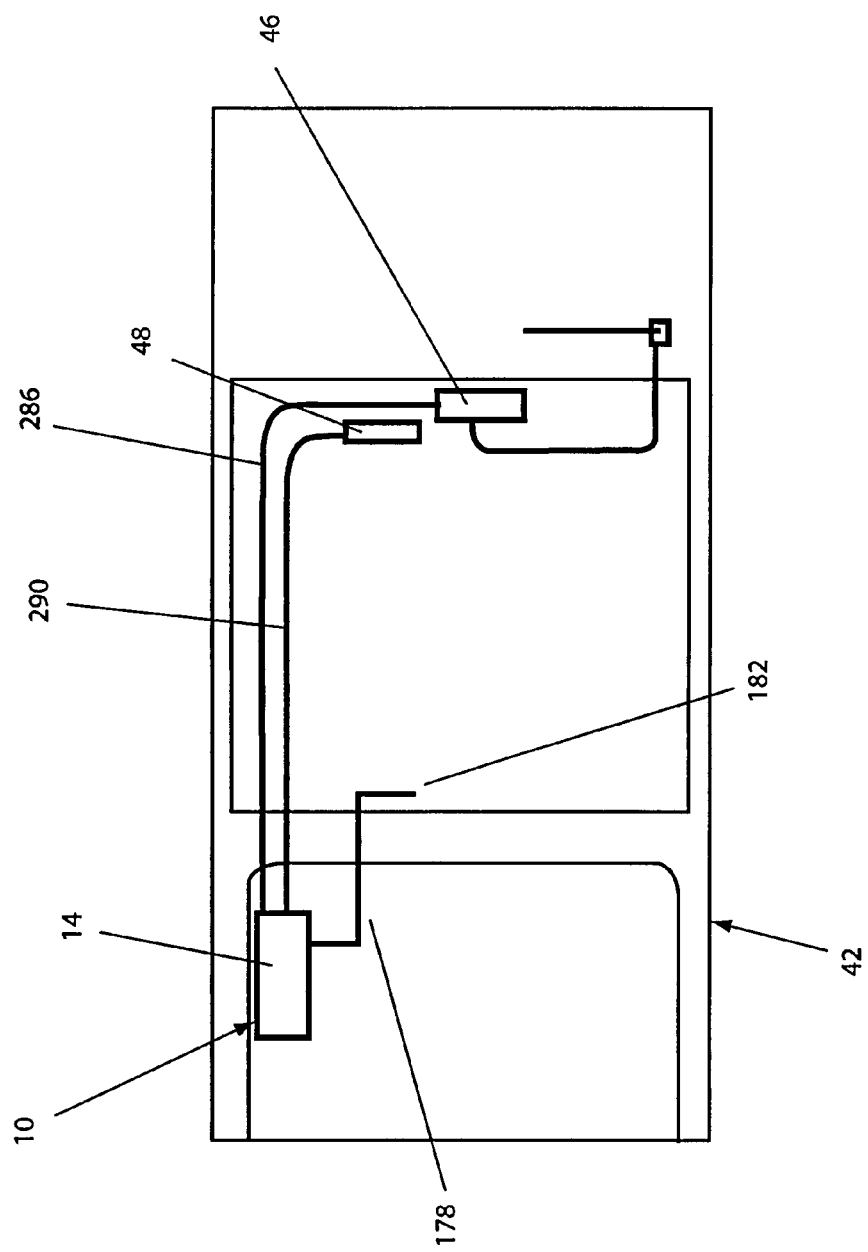
FIG. 2. illustrates a block diagram of an exemplary LAN-based automobile caching and playback sub-system as it is installed in an automobile.
Figure 3:
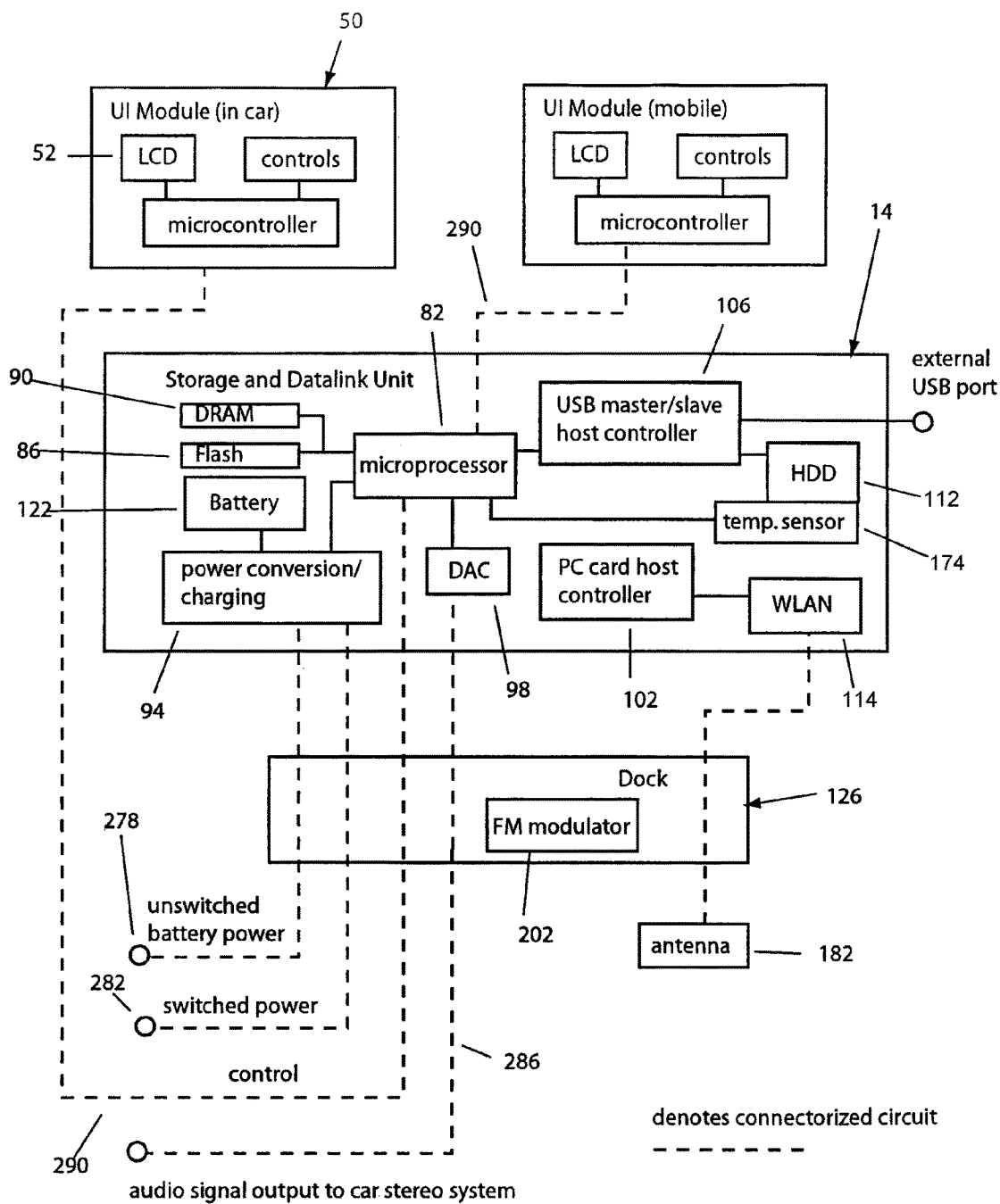
FIG. 3. illustrates a schematic block diagram of an exemplary LAN-based caching and playback sub-system.

Referring now to FIG. 2, a schematic of the storage and playback system 10 is shown super-imposed on an automobile 42. In FIG. 2, a dashed line denotes electrical lines that are connected at dock 126. In one embodiment, the storage and playback system 10 is integrated into an automobile 42 with an existing conventional car stereo 46. Storage and playback system 10 includes a storage and datalink unit 14, and a user interface control module 50. FIG. 3 shows a block diagram of the components of the storage and playback system 10. Storage and datalink unit 14 includes a microprocessor 82, flash memory 86, dynamic random access memory (DRAM) 90, a power conversion and battery charging sub-system 94, a digital-to-analog converter (DAC) 98, a PC card host controller 102, a PC card connector 110, a USB host controller 106 and a 10 gigabyte hard disk drive 112, and a rechargeable internal battery 122. A wireless LAN PC card 114 is included and located in the PC card connector 110 slot. The electronic components and sub-systems of the storage and datalink unit 14 are functionally connected via a printed circuit board 118.

Figure 4:
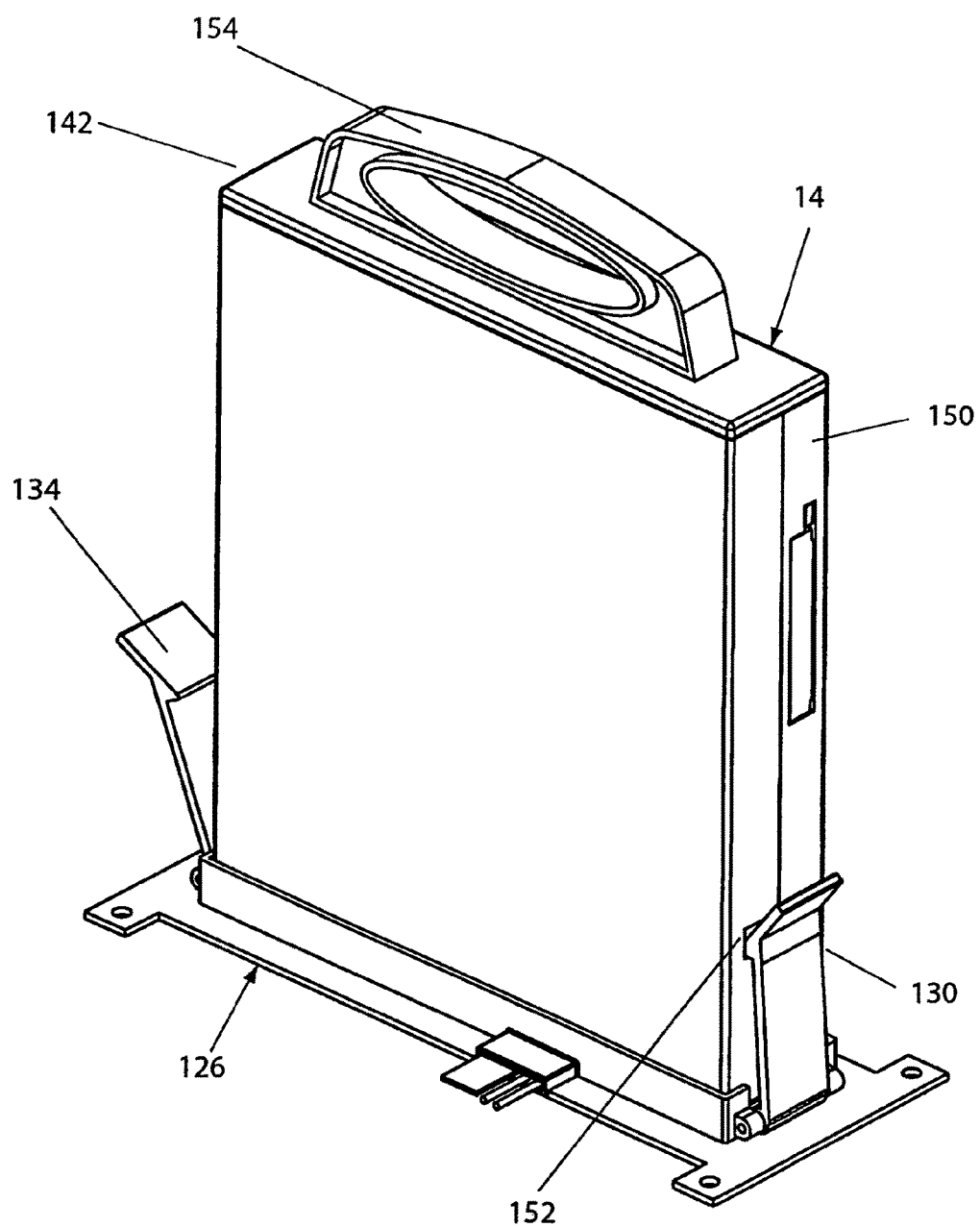
FIG. 4. illustrates an isometric view of an exemplary storage and datalink unit.
Figure 5:
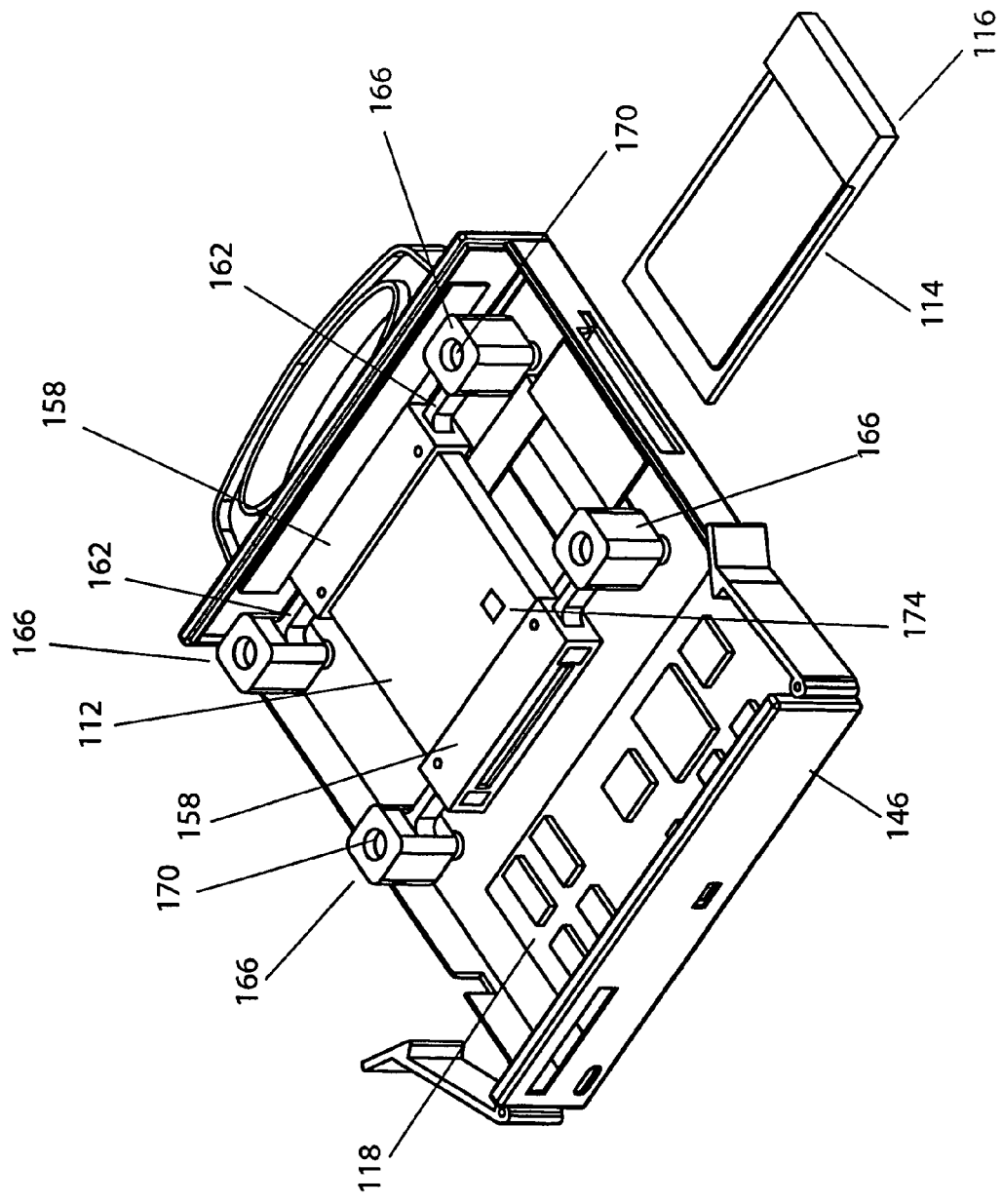
FIG. 5. illustrates an isometric view of an exemplary storage and datalink unit with one side of the enclosure removed.

Storage and datalink unit 14, shown in FIG. 4 and FIG. 5, may be removably attached to automobile 42 by being placed in a dock 126 that is permanently installed in automobile 42. The dock 126 includes a cavity for accepting storage and datalink unit 14. Note that in FIG. 5 that internal battery 122 has been removed so as not to obscure the other components. In one embodiment, storage and datalink unit 14 is mounted in the trunk. In other embodiments, storage and datalink unit 14 is mounted underneath a seat, or in the glove compartment.

Figure 6:
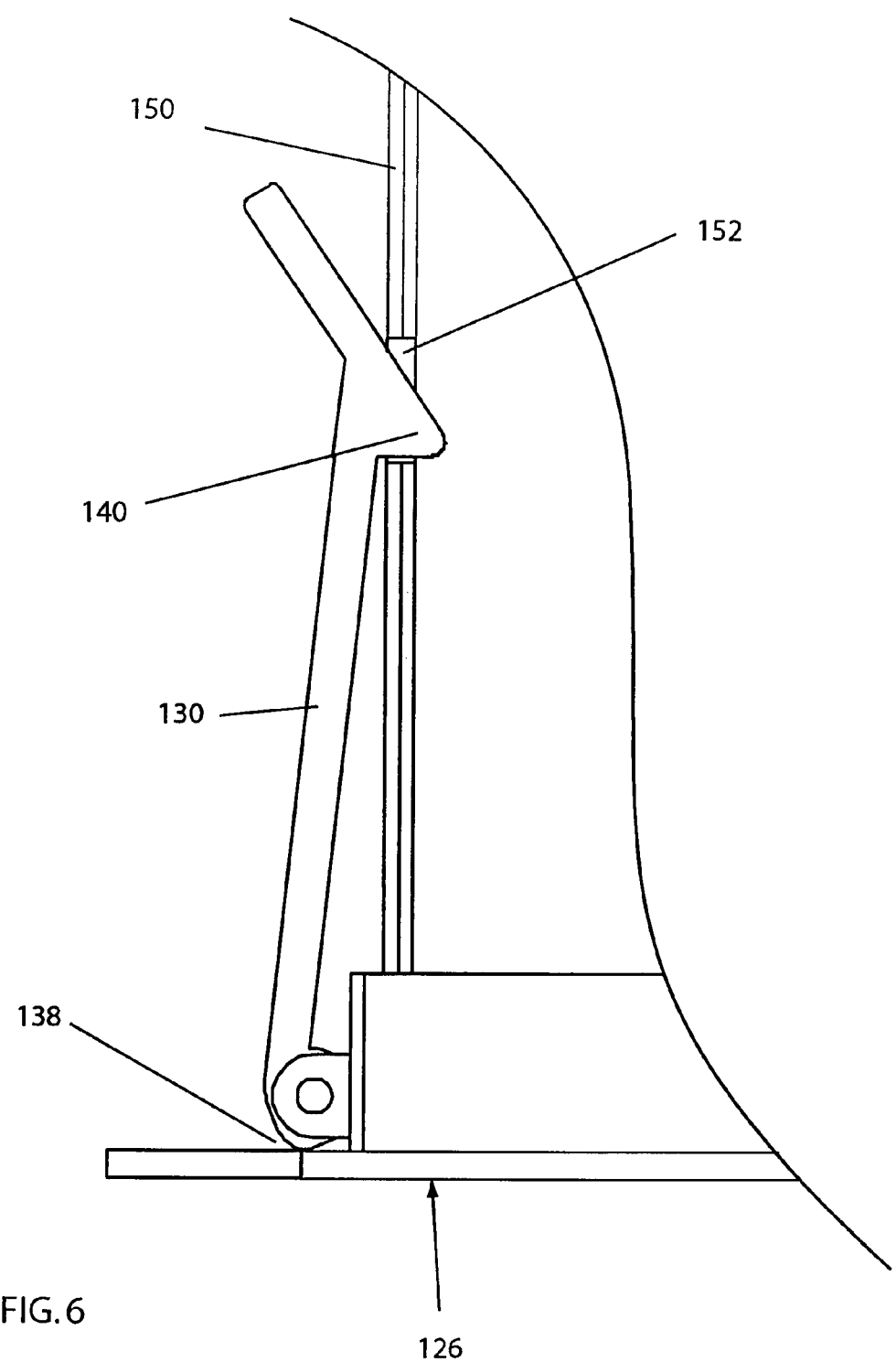
FIG. 6. illustrates a section view of an exemplary snap latch engaged with the enclosure.
Figure 7:
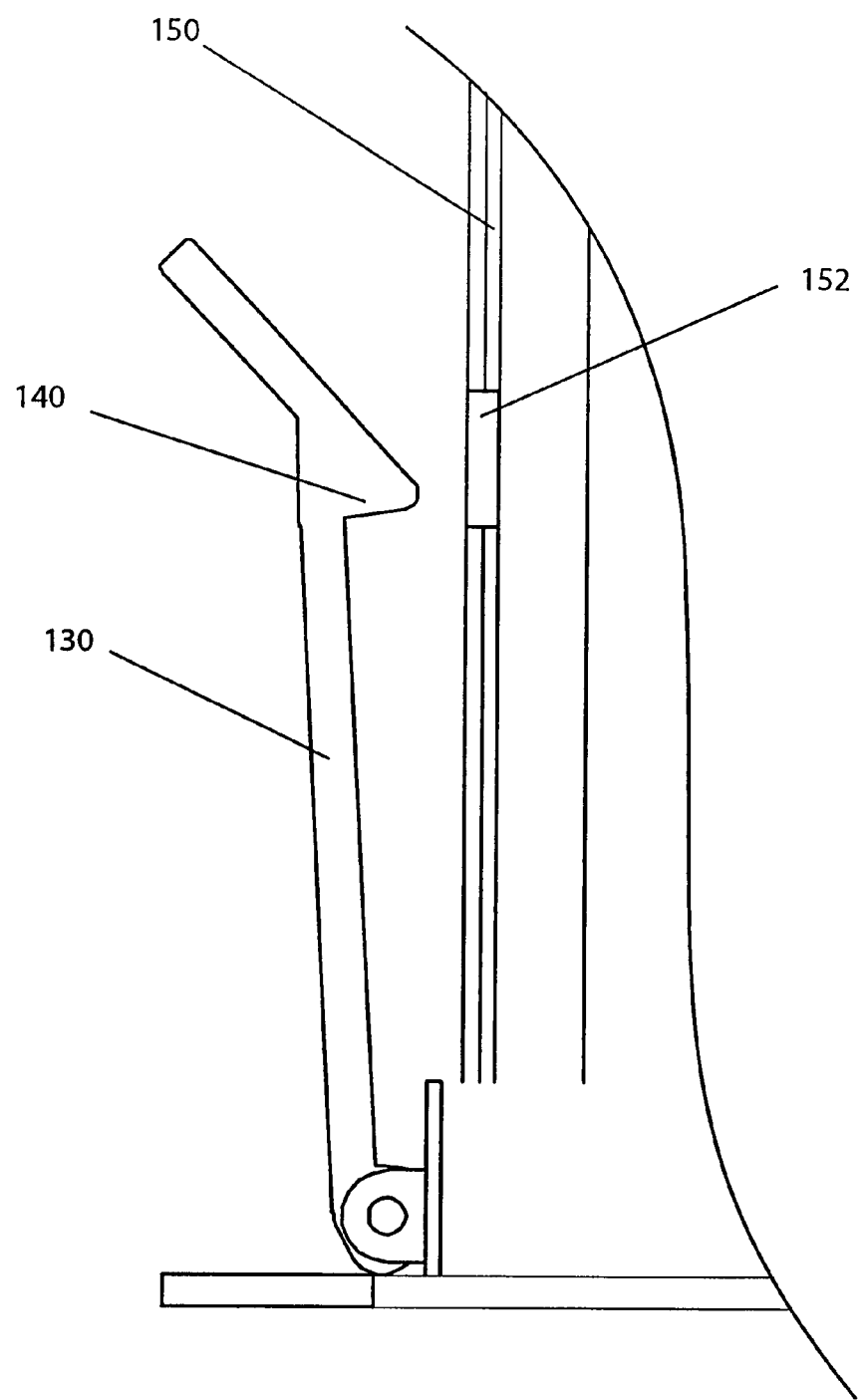
FIG. 7. illustrates a section view of an exemplary snap latch disengaged with the enclosure.

In one embodiment, storage and datalink unit 14 may be locked onto dock 126 using two attachment latches 130 and 134 rotatably attached on either side of dock 126. FIGS. 6 and 7 show a detail view of how latches 130 and 134 function. Latch 130 and 134 includes a latch cam 138 that is a cam lobe positioned such that it contacts the dock 126 and tightens as latch 130 rotates toward storage and datalink unit 14. Latch 130 slightly untightens as latch 130 moves over-center and the latch catch 140 is located in the latch slot 152 on the enclosure 150. This overcenter action insures that latches 130 and 134 stay in the locked position. To remove storage and datalink unit 14 from dock 126, the user rotates latches 130 and 134 away from storage and datalink unit 14, and lifts storage and datalink unit 14 out of dock 126.

The bottom cap 146 of storage and datalink unit 14 includes a data connector and a power connector that connect to correspondingly placed connectors on dock 126. Dock 126 connectors functionally connect storage and datalink unit 14 to unswitched and switched car battery power 278 and 282, connect analog audio signal 286 output to the car stereo 46 head unit, and connect storage and datalink unit 14 to user interface control module 50 in the passenger compartment via a serial connection 290. A coaxial connector A 190 and connector B 194 is also included for connecting wireless LAN transceiver 114 to an antenna extension sub-system 178 that is also located in automobile 42. Storage and datalink unit 14 enclosure 150, top cap 142, and bottom cap 146, consist of injection-molded plastic.

Figure 8:
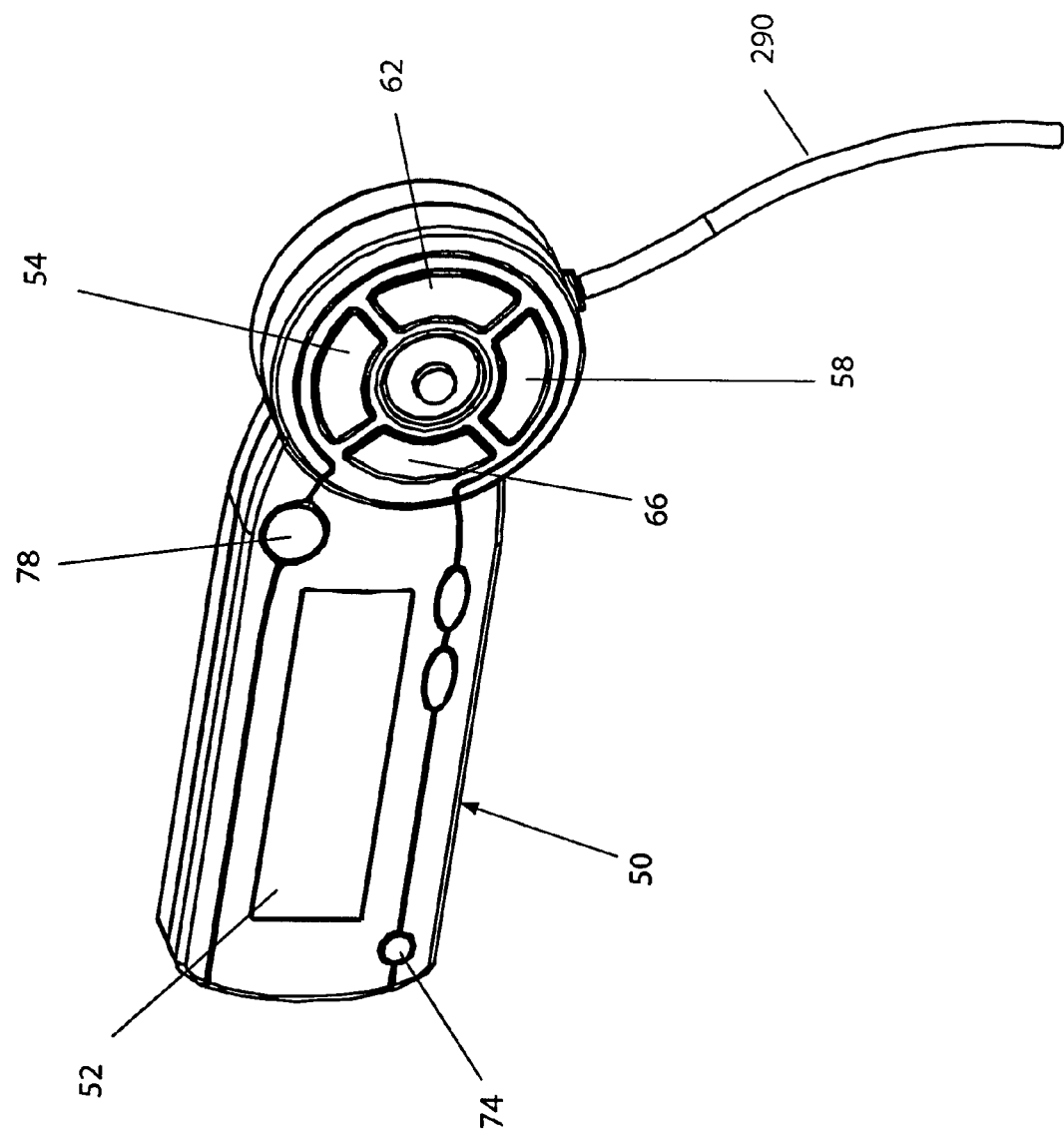
FIG. 8. illustrates an isometric view of an exemplary user interface control unit.

FIG. 8 shows user interface control module 50 that includes a microprocessor, LCD with integral backlight 52, and buttons for allowing the user to control the system, including the following buttons: power on/off 74, play/pause 54, stop 58, forward track 62, and backward track 66. A four-way navigation toggle 70 is also provided, as well as a tag button 78. The electronic components of user interface control module 50 are functionally connected via a printed circuit board. User interface control module 50 is housed in an injection-molded plastic enclosure. FIG. 4 shows that the storage and datalink unit 14 includes a handle 154 integral to the top cap 142 to use for carrying the storage and datalink unit 14.

FIG. 5 shows that hard disk drive 112 is mounted in storage and datalink unit 14 enclosure 150 with a vibration dampening subsystem so that vibrations and impulse loads are not transferred from the automobile 42 motion to the platters and heads inside hard disk drive 112. The vibration dampening subsystem includes of two elastomeric suspension caps 158, one each attached to the top and bottom of hard disk drive 112. The elastomeric suspension caps 158 have rectilinear concavities that fit over the ends if hard disk drive 112. Additionally, four screws are placed through holes in the elastomeric suspension caps 158 that correspond with mounting screw holes on hard disk drive 112, to further secure elastomeric suspension caps 158 to the hard disk drive 112. Each elastomeric suspension cap 158 includes two suspension flexures 162 that are narrow sections of the elastomeric material that extend laterally away from hard disk drive 112. These suspension flexures 162 elastically deform during shock loads.

FIG. 5 also shows that suspension flexures 162 have integral suspension mounts 166 that attach to suspension pins 170 integral to enclosure 150. The geometry of elastomeric suspension caps 158 and flexures 162 are such that the storage and datalink unit 14 enclosure 150 can move relative to hard disk drive 112 in multiples axes of motion during impulse and vibration loads, to absorb the shock of automobile 42 motions. However, hard disk drive 112 cannot come into contact with any aspect of enclosure 150 or other components other than elastomeric suspension caps 158. A flexible ribbon cable (not shown) electrically connects hard disk drive 112 to the computer sub-system. Elastomeric suspension caps 158 are homogeneous parts molded out of Dynaflex thermoplastic elastomer, provided by GLS Corporation, of Illinois.

In one embodiment, resistance temperature device (RTD) temperature sensor 174, shown in FIG. 5 is conductively attached to hard disk drive 112 with conductive epoxy, and is electrically connected to microprocessor 82.

Figure 9:
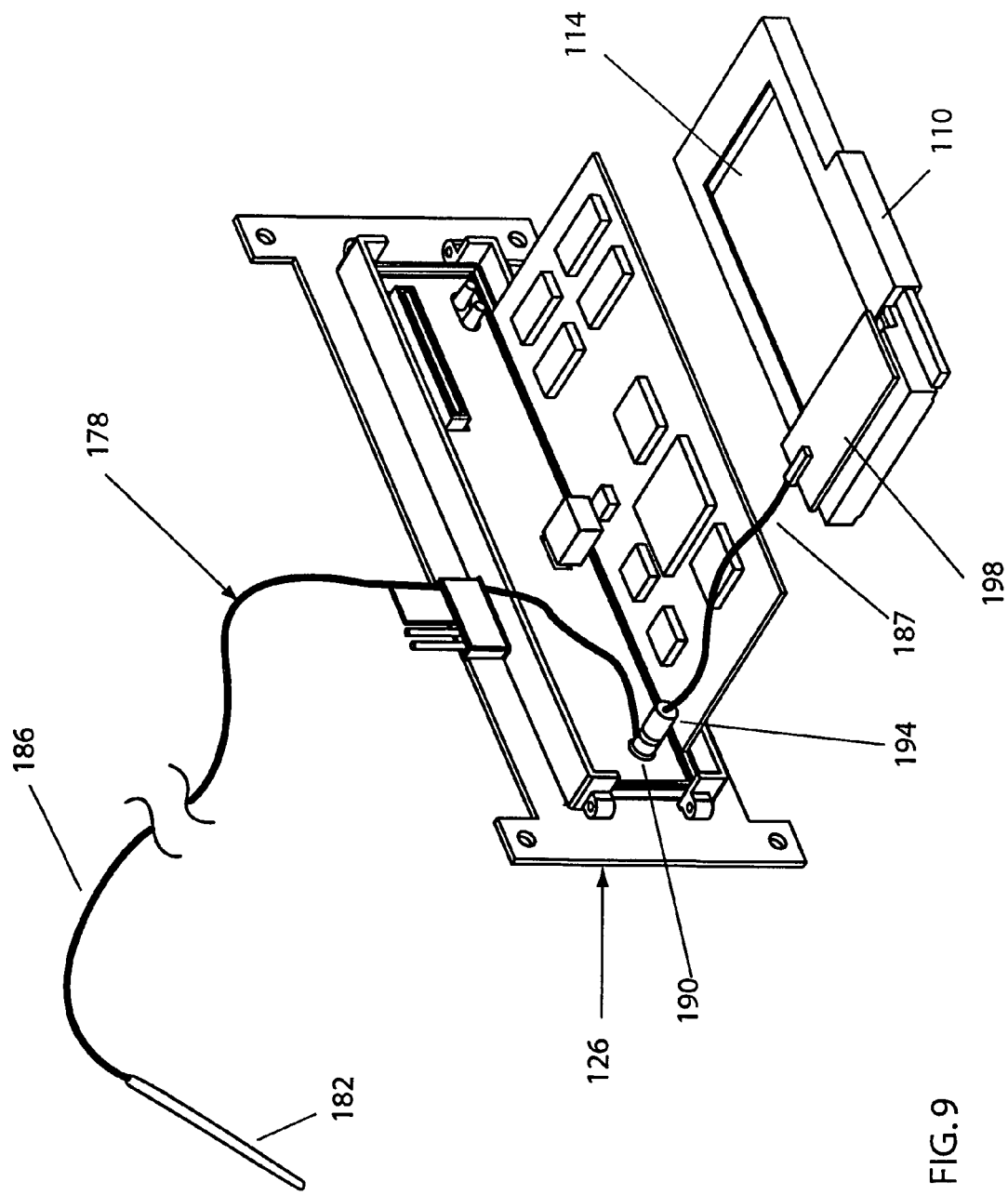
FIG. 9. illustrates an exemplary LAN-based content delivery system antenna subsystem.

In one embodiment, as shown in FIG. 9, an antenna extension sub-system 178 is used to insure that a dipole antenna 182 is positioned to receive a clear signal from wireless LAN access point 30. Dipole antenna 182 at the end of a shielded coaxial wire 186 is positioned on the top surface of the rear seat deck in automobile 42. In another embodiment, antenna 182 is mounted behind a plastic bumper cover. A length of shielded coaxial cable 186 extends into the trunk where it is terminated with one side of a coaxial connector A 190 at dock 126. A printed circuit board antenna 198 is fixed in storage and datalink unit 14 enclosure 150 in close proximity to wireless LAN PC card transceiver 114 antenna 116. A shielded coaxial cable 187 is connected to printed circuit board antenna 198 and terminates with a coaxial connector B 194 that mates to coaxial connector A 190 when storage and datalink unit 14 is placed into dock 126.

Figure 10:
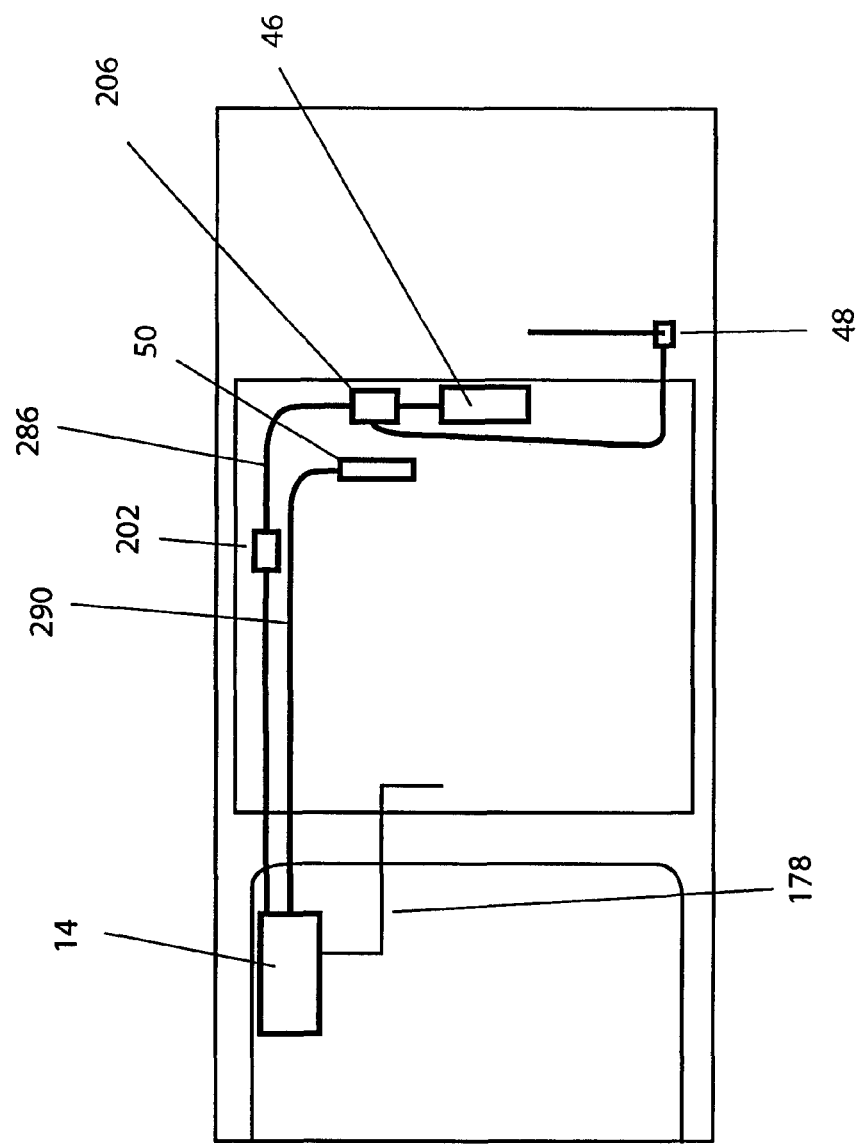
FIG. 10. illustrates a schematic diagram of an exemplary storage and playback system connected to a car stereo via an FM antenna.

In one embodiment, the output of DAC 98 is plugged directly into line level inputs in the existing car stereo 46 system head unit. DAC 98 converts decompressed digital audio to an analog signal at line levels. In this case the existing car stereo 46 system must provide the ability to switch to an auxiliary source. In another embodiment, shown schematically in FIG. 10, the analog audio signal 286 that is output from storage and datalink unit 14 is input into the automobile audio system by being plugged into an FM antenna tap 206. The analog output from DAC is modulated by an FM modulator 202. To use this set-up, the user must tune the existing car stereo to an FM frequency at the low end of the FM band, such as 87.5, and the audio content is played on the existing car stereo 46 system This type of connection into existing car stereos 46 is commonly found in after-market CD changers.

Considering now the software and system control applications and referring again to FIG. 1, a system control application 210 runs on PC 18 and is comprised of two sub-applications, the core module 214 and the graphical user interface (GUI) module 218. Core module 214 manages the basic communication between Internet and PC 18, and PC 18 and between storage and playback system 10. In one embodiment, core module 214 is implemented as a multi-threaded Java application running on a PC 18. A Windows version of a Java Virtual Machine (JVM) resides and runs on PC 18 and interprets core module 214 instructions for the windows operating system.

Core module 214 includes the portion of the system control application 210 that acts on content and data 234 from Internet 222 and also processes communications with storage and playback system 10, providing, but not limited to, the following functions:

1. Communication links: a. Accessing content on Internet at a prescribed location as determined by user inputs into the GUI content editors such as web-based content selection guide 246, b. Communicating with GUI module 218, and c. Accessing and communicating with storage and playback system 10;

2. Managing the caching (local storage) of content from Internet or otherwise digital content files 234;

3. Reading from and writing to content database 226;

4. Transfer of content files 234 from Internet 222 to LAN-based system: a. Managing and routing transfers of digital content files 234 from Internet 222 to storage and playback system 10, and b. Managing and routing transfers of cached digital content files 234 on PC 18 to storage and playback system 10;

5. Scheduling—time-based automation of the accessing, caching, and transfer of content 234 from Internet 222 at times prescribed by the user or at times derived by direction given by rules through the GUI content editors such as web-based content selection guide 246. The scheduling function accesses time and date inputs associated with actions stored in content database 226 by GUI module 218. The scheduling function periodically compares these time and date entries with the current state of PC 18 internal timer. When there is a match, the action is taken;

6. Network Address Translation (NAT) and routing—digital file 234 transfers that occur directly from the Internet 222 to storage and playback system 10 require a real time connection to Internet 222;

7. Storage and playback system 10 Application/Software Delivery—storage and playback system 10 control firmware 270 updates can be stored at PC 18 and delivered to storage and playback system 10 on an as-needed basis. For example, a new or updated CODEC 274 (sent as a BLOB—binary large object) can be delivered to storage and playback system 10 via wireless LAN 34 and installed into memory. Other types of applications can be delivered to storage and playback system 10;

8. Transcoding—Certain types of content 234 will be received at PC 18, decoded, re-encoded using a different CODEC at PC 18, and then transferred to storage and playback system 10;

9. Auto-discovery—storage and playback system 10 will automatically authenticate on wireless LAN 34 when in range. Core module 214 listens for periodic broadcasts from storage and playback system 10;

10. Message Transactions—text or other content or data 234 from the Internet 222 can be transferred to storage and playback system 10 and presented on LCD 52;

11. Tag servicing—Tagging is described in greater detail later in this document. Tag servicing includes a function where core module 214 periodically accesses a specific location on Internet 222 to acquire and store an accurate time and date; and 12. Synchronization—Data, such as user data and related information, such as an accurate time and date, must be synchronized across the three platforms (web, storage and playback system 10, and PC 18). Core module 214 time and date data is thus synchronized with an external (absolute) standard.

GUI module 218 is implemented as a Win32 application and resides and runs on PC 18. GUI module 218 is used by end users to organize and manage digital content 234 and content preferences. User content selections made using GUI module 218 are stored in a local content database 226 by core module 214. Based on user inputs into GUI module 218, core module 214 modifies content database 226 using methods called over HTTP and expressed with XML grammar. Two examples of GUI module 218 functions are provided below to show how system control application 210 functions to deliver content to storage and playback system 10. An audio playlist editor 238 is described that allows users to organize their local audio content 234; and a web-based content selection guide 246 is described that allow users to select digital subscription content services.

GUI module 218 includes segments of the software application that run the GUI, including, but not limited to, the following functions:

1. Displaying GUI elements on a computer display for view by the end user;

2. Acknowledging user responses made via mouse and keyboard, or other pointing and interaction devices;

3. Allowing for manipulation of the GUI elements such as: a. drag and drop of content objects, b. GUI button activations, c. text entry, d. pull down menu and menu selections; and e. initiation and operation of dialog boxes; and 4. Communication between GUI module 218 and core module 214. The selections and control manipulations made by the end user are communicated to core module 214 where they can be acted upon.

System control application 210 is designed to function with a number of instances of core module 214, content database, and GUI module 218 running concurrently on multiple PC 18s and or storage gateways, all connected by the same LAN. It is anticipated that users will own and operate multiple PCs 18 in a single home for example, with different content cached on each PC 18. In another embodiment, a digital set-top box with a DOCSIS cable modem 22 and a wireless LAN transceiver could include an instance of core module 214 and content database 226 in addition to the instance on PC 18. In one embodiment, the focus will be on a singular GUI module 218 located and executed on a PC 18.

Figure 11:
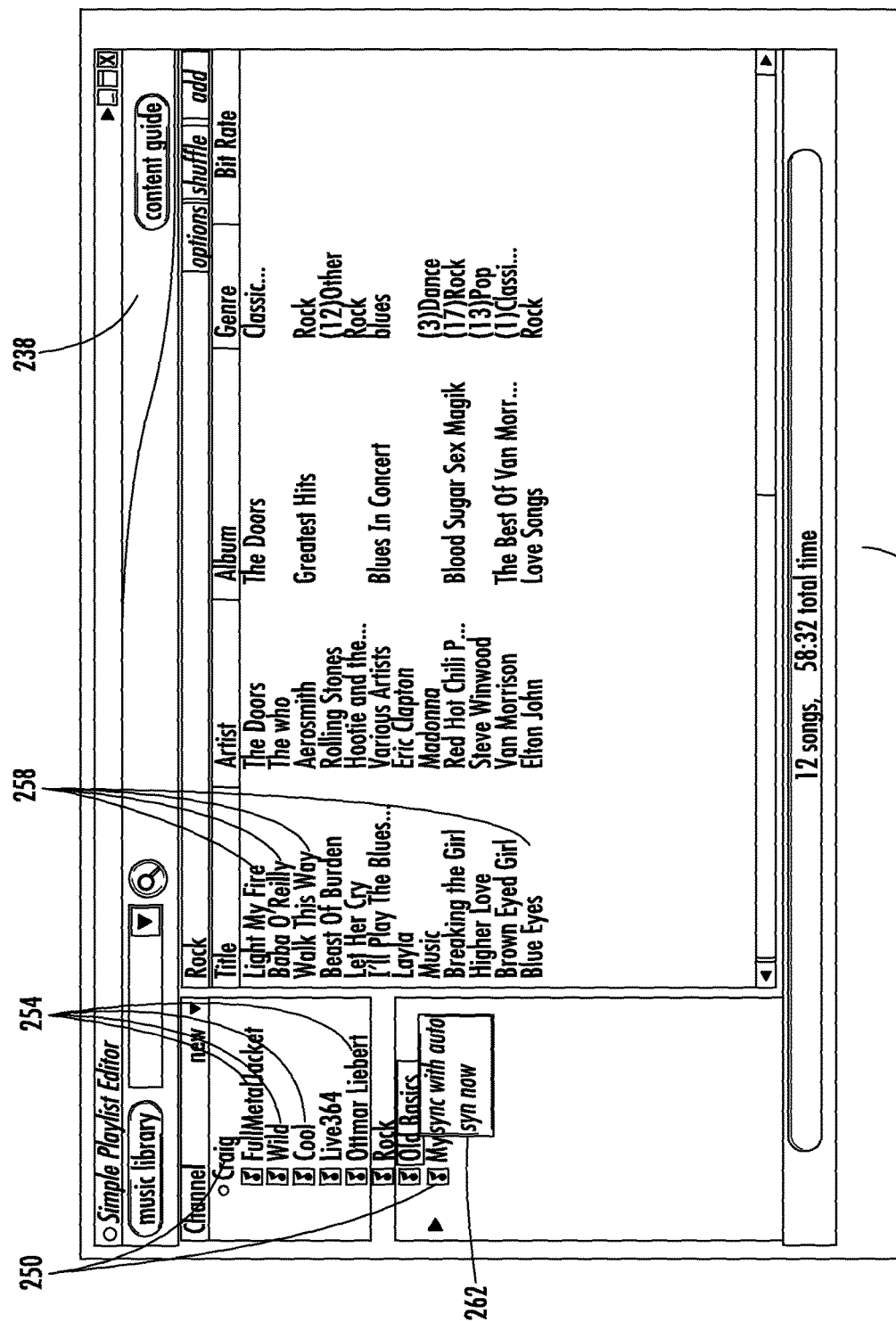
FIG. 11. illustrates an exemplary PC desktop with a audio device playlist editor.

FIG. 11 shows the audio playlist editor 238 as it appears to the user on PC desktop 236, and shows that there are three levels of organization: channels 250, playlists 254, and tracks 258. Channels 250 are lists of playlists 254, and playlists 254 are lists of tracks 258. A track 258 (audio file name) shown in audio playlist editor 238 is a GUI element that signifies a file and a path designation on hard disk drive 26 on PC 18, and a listing in content database 226. Using the audio playlist editor 238, users can create, delete, and rearrange channels 250 and playlists 254, can rearrange track 258 orders, and can add tracks 258 to playlists 254 by navigating to the location of the local digital audio files 234 using a standard Windows dialog box. Tracks 258 can also be added to playlists 254 by dragging and dropping digital audio file 234 icons from windows onto the track field of the audio playlist editor 238.

The user may obtain digital audio files 234 that are stored on PC 18 hard disk drive 26, such as MP3 files, in a variety of ways, and organize these files, otherwise known as tracks 258, into channels 250 and playlists 254 using an audio playlist editor 238 aspect of GUI module 218, as described above and shown in FIG. 8. Audio device playlist editor also includes the ability to select specific channels 250 or playlists 254 to be replicated on storage and playback system 10. As shown in FIG. 11, this function is accessed by right-clicking on a channel 250 or playlist 254 name and selecting "sync with auto". A right-click pull down menu 262 is shown in FIG. 11. For example, a user can make a channel 250 entitled "MyCar" and include several playlists 254 each including several songs, and then make the "sync with Auto" selection. Subsequently, only the "MyCar" channel 250 and all child playlists 254 and tracks 258 win be wirelessly synchronized into storage and playback system 10. The right-click menu on each channel 250 and playlist 254 also includes a "sync now" selection, which initiates the synchronization and subsequent file transfer process immediately (assuming that automobile 42 is within range of wireless LAN 34).

Additionally, a selection is included under the "options" menu to automatically synchronize all channels 250 and playlists 254 with locally cached content 234. If selection to synchronize all channels 250 is not selected in the "options" menu, then no files are transferred to storage and playback system 10.

A user may also make selections for receiving periodic content delivered to storage and playback system 10 using a web-based content selection guide 246 aspect of GUI module 218, as described above and shown in FIG. 10. Selections made using the web-based content guide 246 for periodic content services require system control application 210 to periodically access Internet 222 servers where content is located and download and cache content locally on PC 18 hard disk drive 26. These content selections made by user using aspects of GUI module 218 are recorded in content database 226 by core module 214.

Figure 12:
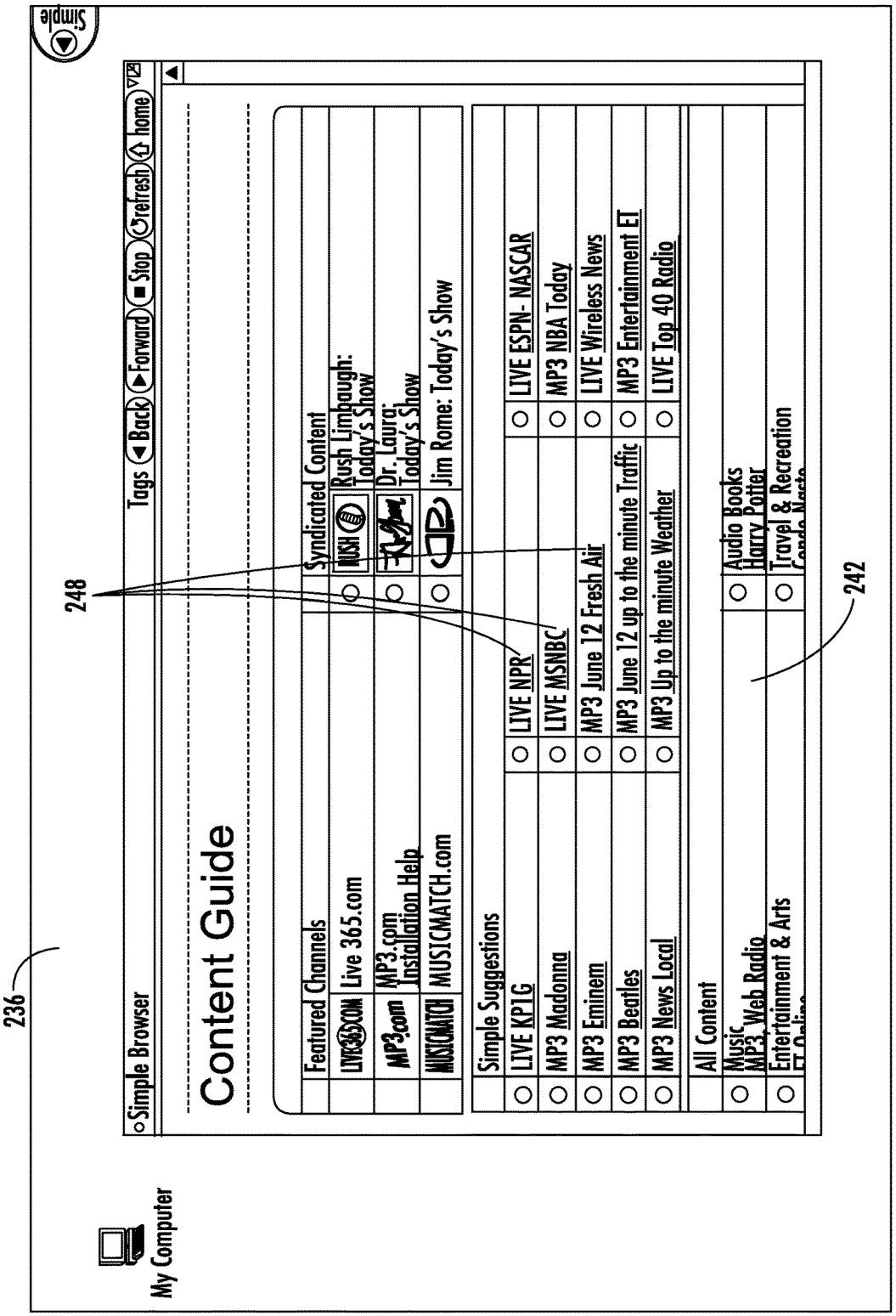
FIG. 12. illustrates an exemplary PC desktop with a content subject guide page.

In one embodiment, the web-based content selection guide 246 simplifies and facilitate the discovery and selection of subscription content services on the Internet 222 for periodic distribution into storage and playback system 10. Referring now to FIG. 12, web-based content subject guide 242 is html-formatted web pages accessed through a mini-browser, and shows a range of content subjects 248. Selecting "NPR" on web-based content subject guide 242 results in the content selection web page 246 shown in FIG. 14. A content selection 264 with a check box 268 is shown. Selections made using this interface result in the creation of pointers to locations of digital audio files 234 on Internet 222 servers. These files are periodically accessed and downloaded to PC 18 hard disk drive 26 for subsequent transfer to storage and playback system 10. The periodicity at which subscription content files 234 are downloaded are based on rules provided by each content provider. For example, some content files 234 are refreshed on the content provider's Internet 222 server on a daily basis at 1:00 am. In this case, one rule for accessing the server and downloading the content file 234 is that it must happen after 1:00 am. The pointers to Internet 222 content files 234 as well as the rules governing the downloading of files 234 are stored in content database 226.

Web-based content guide capability may include, but is not limited to the following functionality:

1. Content type—As per FIG. 12, an interface is provided that begins with general content subject 248 links, and as the user makes selections, the content subjects 248 become more specific and culminate in the presentation to the user of content selections 264;

2. Content Selection 264—As per FIG. 13, a user may subscribe to a daily version of a radio show. When box 268 is checked, a pointer and rules for downloading the digital audio file 234 are transferred from an Internet 222 server to content database 226 (by core module 214). Subsequently, the latest version of the radio show digital audio file 234 is automatically transferred from a content provider's Internet 222 server to PC 18, and from PC 18 to storage and playback system 10, by core module 214 according to the download rules; and 3. A system to retain user preference information for the purpose of customizing the web-based content guides according to the users preferences.

Storage and datalink unit 14 includes an operating system that is Linux in one embodiment. Referring again to FIG. 1, control firmware 270 is present on storage and datalink unit 14. A content database is also stored on storage and datalink unit 14. Some functions of control firmware 270 include, but are not limited to the following:

1. Operate wireless LAN 34 broadcast duty-cycle to auto-discover storage and playback system 10;

2. Communicate with PC 18 via wireless LAN 34—includes management of security code that is used to encrypt wireless communications on wireless LAN 34;

3. Synchronize (transfer or delete) content as per changes in content database 226 on PC 18—When communication with PC 18 occurs, control firmware 270 compares the contents of content database 226 on PC 18 with content database 230 on storage and playback system 10. This action is described in greater detail below;

4. Monitor and respond to control inputs from user interface control module 50;

5. Decode digital audio files 234 and convert to analog signal 286 as per input from controls—CODECs 274 stored in memory and executed by operating system decode digital audio files 234. Control firmware 270 includes a large buffering function where hard disk drive 112 can read ahead and store significant amounts of digital audio file 234 that is currently being decoded, in DRAM, so that hard disk drive 112 head can park. By buffering large amounts of digital audio file 234 in this way, hard disk drive 112 head can maintain a shorter operating duty cycle when the head is in its read position over a platter. The less time the head is located over a platter, the less likely a head crash will occur due to an impulse load from the motion of automobile 42; and 6. Hard disk drive 112 temperature monitoring—The temperature sensor on hard disk drive 112 is continually monitored with a duty cycle of 1-2 minutes. If the temperature closely approaches the specified operating temperature limits of hard disk drive 112 (typically between 5 and 55 degrees Celsius), hard disk drive 112, control firmware will disable hard disk drive 112 (the platters will not be allowed to spin and the head will be parked).

When automobile 42 is running, wireless LAN transceiver 114 is disabled, storage and playback system 10 may be operated using automobile battery power, and automobile 42 power system is recharging storage and datalink unit's 14 internal battery 122. When automobile 42 is turned off, storage and playback system 10 may be used to play music (discussed below) using internal battery 122 as the power source. When automobile 42 is turned off, computer subsystem in storage and datalink unit 14 is operational, wireless LAN transceiver 114 is enabled and, under control of control firmware 270, broadcasts a message every 10 minutes. This activity is powered by the storage and playback system 10's internal battery 122. By using internal battery 122, the automobile's 42 main battery is never drawn down by storage and playback system 10 activity. This message broadcast by storage and datalink unit 14 is encoded using the user's security code, thus the storage and playback system 10 will only receive a response when it is in the presence of the user's wireless LAN 34 radio-frequency field.

Figure 14:
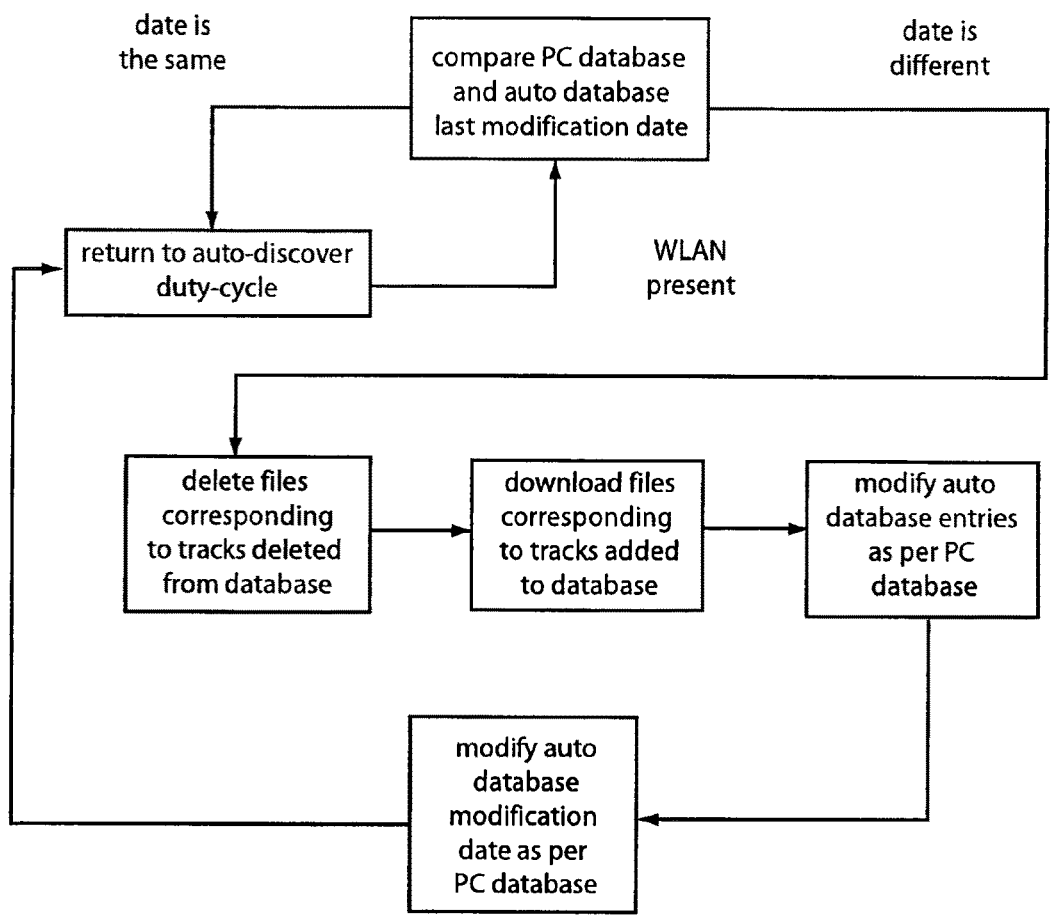
FIG. 14. illustrates an exemplary storage gateway system to storage and playback system synchronization flow chart.

Once wireless LAN-based communication is established between storage and playback system 10 and gateway storage system, core module 214 and control firmware 270 engage such that the content database 226 on PC 18 and content database 230 in storage and playback system 10 hard disk drive 112 are compared and actions are taken. FIG. 14 is a flowchart showing the process for comparing the content databases 226 and 230 and for synchronizing content according to new user selections.

Referring to FIG. 2, user interface control module 50 is connected to storage and datalink unit 14 via a cable, and is located in passenger compartment within reach of driver or passenger. User interface module 50 may be mounted on the dashboard, or may be placed so that the user can hold user interface module 50. User interface module 50 includes LCD 52 that enables the display of three levels of the interface, channels 250, playlists 254, and tracks 258. User interface module 50 also includes a center four-way joystick control 70, that allows the user to navigate between levels, and laterally within levels.

Figure 15:
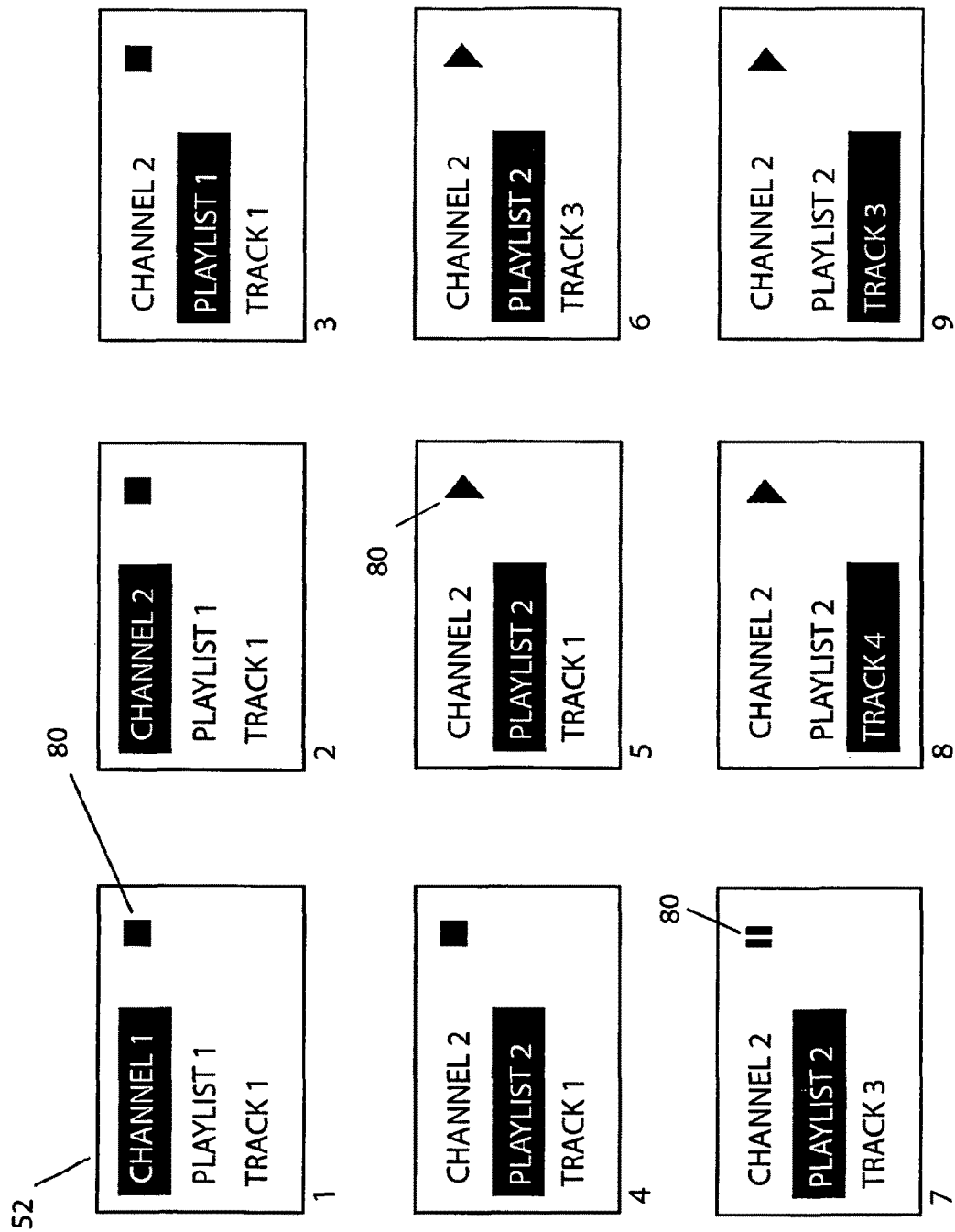
FIG. 15. illustrates an exemplary user interface module LCD sequence.

FIG. 15 shows a sequence of LCD 52 screens that describes how the interface functions. For example, when 4-way joystick 70 is pushed up, highlight on LCD 52 moves up one level. Likewise when 4-way joystick 70 is moved to the right, highlight on LCD 52 moves to the next entry on that level. The functions of the other control buttons, such as previous track 66 and stop 58 are well known in the media player field:

Screen 1—the initial state of the user interface control module 50 is shown. The top line of text shows the current channel 250, the second line of text shows the current playlist, and the third line of text shows the current track 258. The player status icon 80 shows the filled square symbol, which is the conventional symbol for a playback system 10 that is in "stop" mode, i.e., nothing is playing. The channel 250 level is highlighted by being graphically reversed (text is white with black background);

Screen 2—This screen shows the result of activating the right navigation on joystick 70. The channel level label changes to "channel 2". The labels at the playlist 254 level and the tracks 258 level also update to reflect the new items in "channel 2";

Screen 3—This screen shows the result of activating down navigation on joystick 70. The highlight moves from the channel 250 level to the playlist 254 level;

Screen 4—This screen shows the result of next activating right navigation on joystick. The playlist 254 level changes to "playlist2", the next playlist 254 organized under "channel 2". The track 258 level text also updates to reflect the actual first track 258 included in "track 1" under "playlist 2";

Screen 5—This screen shows the result of next activating the play/pause button 54 on user interface control module 50. "Track 1" begins to play;

Screen 6—This screen shows the result of next activating the next track button 62 twice on interface control module 50. "Track 3" begins to play. The player status icon 80 changes from a black square to a right-pointing triangle;

Screen 7—This screen shows the result of next activating the play/pause button 54 while a track 258 is playing. The track 258 stops playing and the player status icon 80 is the "pause" icon;

Screen 8—This screen shot shows the result of a few different actions. First, the play/pause button 54 was activated, thus "Track 3" begins to play where it left off when the play/pause button 54 was activated. Next, right navigation on joystick 70 is activated once. The track 258 line advances to show the next track 258, or "Track 4" in "Playlist 2". "Track 3" continues to play. This feature allows the user to browse through the channel 250/playlist 254/ track 258 list structure while continuing to listen to a currently playing track 258; and Screen 9—This screen shows the result if no other buttons are activated for six seconds. The display reverts back to display the channel 250, playlist 254, and track 258, that is currently being played.

Audio content is played through the car's existing stereo speakers and is modified (treble, base, loudness, etc.) using the existing car stereo system's controls.

Storage and datalink unit 14 may be removed by unlatching the left and right latches 130 and 134. There are several reasons for removing storage and datalink unit 14: for alternate synchronization methods, to insure operation when automobile 42 is subject to temperature extremes, and for use as a mobile media player.

There are two alternate synchronization methods. It should be noted that storage and datalink unit 14 continues to periodically broadcast (searching for a server) even when it is removed from automobile 42. For scenarios where a user cannot place their automobile 42 within range of the home wireless LAN 34 (such as if a user lives in an apartment building), storage and datalink unit 14 can be removed and hand carried within range of home wireless LAN 34, and wireless communication and synchronization occurs as described above.

Synchronization can also occur through a wired USB connection directly to PC 18. System control application 210 on the user's PC 18 automatically recognizes storage and datalink unit 14, and performs the appropriate synchronization, similar to that which is described for in the wireless LAN 34 scenario.

In climates where ambient temperatures that exceed the operating temperature range of hard disk drive 112, users can remove storage and datalink unit 14 and store it in a heated or air-conditioned environment while they are not operating automobile 42. Storage and datalink unit 14 is then installed when user operates automobile 42.

Tag button 78 included on user interface module 50 in FIG. 8 is used to produce a digital record of audio content 234 that is played on the storage and playback system 10 that is of particular interest to the user. When the user would like to receive more information about an audio content item 234 he or she is listening to, the user pushes tag button 78. A software process is triggered whereby a record of the audio content being played, including information such as song (file) title and ID3 data that is embedded in content file 234, is stored in a tag database 266 in memory in the storage and datalink unit 14. The time and date of tag button 78 activation is also stored in tag database 266.

When automobile 42 is in range of the local wireless LAN 34, the record of tagged items is automatically transferred to tag database 294 associated with system control application 210 on home PC 18 storage gateway system, from which it is automatically transferred to the user's tag aggregation page at a website associated with the user. Software applications on the website process the tag record information and provide the user with more enhanced information, or ancillary content, that is associated with the tagged content. The user can then use any HTML-based browser, such Internet Explorer or Netscape Navigator, commonly found on home PCs 18, to browse the tag aggregation web page and associated ancillary content. Ancillary content is for example information about a particular song artist, album art, song lyrics, concert dates, options to purchase subsequent content, or information about purchasing and/or downloading a particular digital audio file 234.

The tag feature works with both downloaded audio content and broadcast radio content. For downloaded content, the song title and other meta-data will be embedded in the digital audio file 234 and thus the song title and other information can be accessed directly by the control firmware 270. Radio content tagging involves recording the radio tuner frequency, time, and date information. When this data is transferred to a specific tag-processing software application on a server on Internet 222, the data can be used to retrieve information about that particular song through radio station playlist information services that publish play lists for broadcast content.

In this embodiment, storage and datalink unit 14 is used as a mobile digital audio player. Interface control module 50 receives power from storage and datalink unit 14, and storage and datalink unit 14 is able to operate fully when operated outside of automobile. In one embodiment, a mobile interface control unit is able to plug into storage and datalink unit 14. In this embodiment, storage and datalink unit 14 also includes a headphone output jack. The mobile interface control unit is used to power on the storage and datalink unit 14, and the interface controls are used as described above. When the play button is activated, the specified audio file 234 is decoded an audio signal is produced for use with headphones. In a different embodiment, the interface control module 50 includes a connector several inches down the cable 290 that is installed permanently in automobile 42, and is able to be unplugged from the installed cable 290 and plugged into a corresponding connector in storage and datalink unit 14. Thus the same interface control module 50 can be used in the automobile and also as a mobile interface control module 50.

Figure 16:
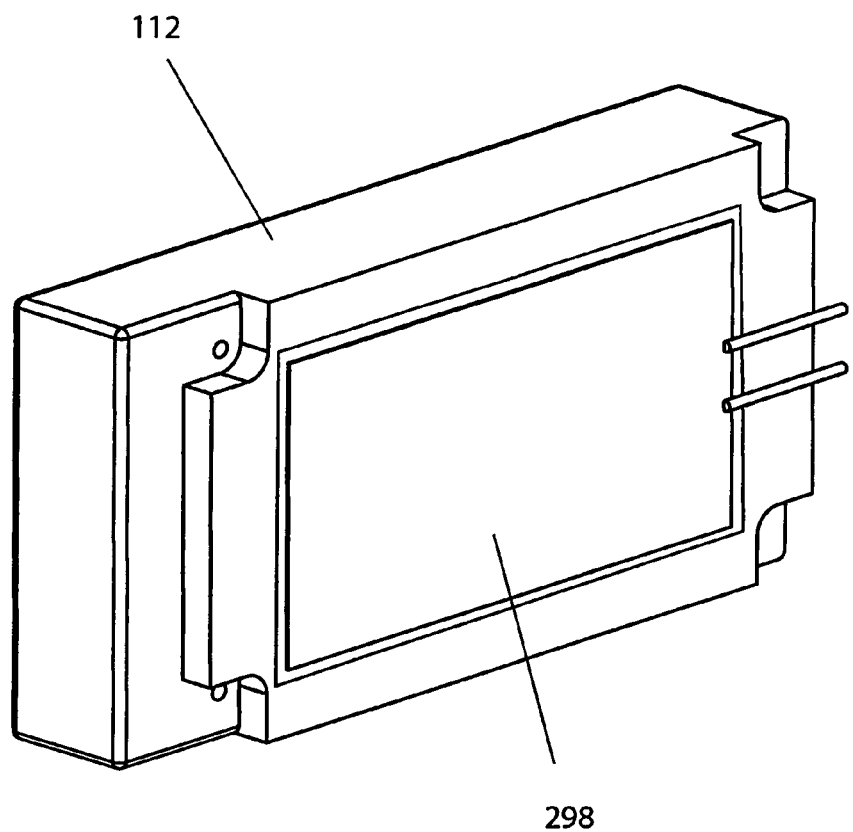
FIG. 16. illustrates an exemplary hard disk drive with a heating element attached.

To provide for hard disk drive 112 operation during a cold temperature extreme, one embodiment of storage and playback system 10 includes a hard disk drive 112 heating subsystem. Hard disk drive 112 heating subsystem consists of a copper clad Kapton heating element 298 fixed in contact with hard disk drive 112 housing, as shown in FIG. 16. A thin layer of thermally conductive adhesive is used to attach Kapton heating element 298 to hard disk drive 112. Kapton heating elements 298 are a well-known technology for heating items when space is a constraint. Current is send through large copper traces adhered to the Kapton substrate. The current subsequently produces heat, which is conducted to hard disk drive 112 housing.

The temperature monitoring sub-system, which is an aspect of control firmware 270, controls the heating of hard disk drive 112 so that the operating temperature limit is not exceeded.

Figure 17:
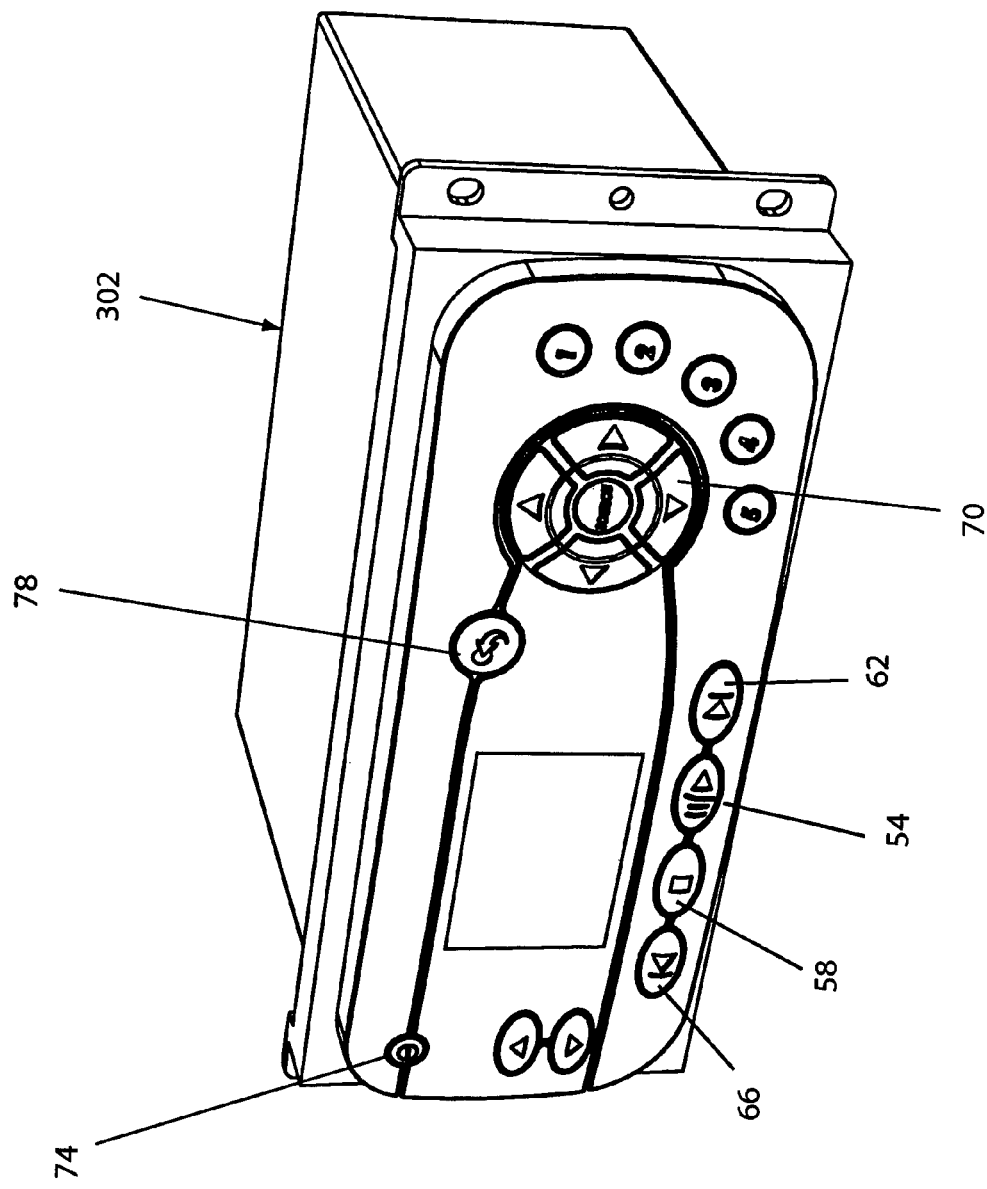
FIG. 17. illustrates an exemplary integrated head unit.
Figure 18:
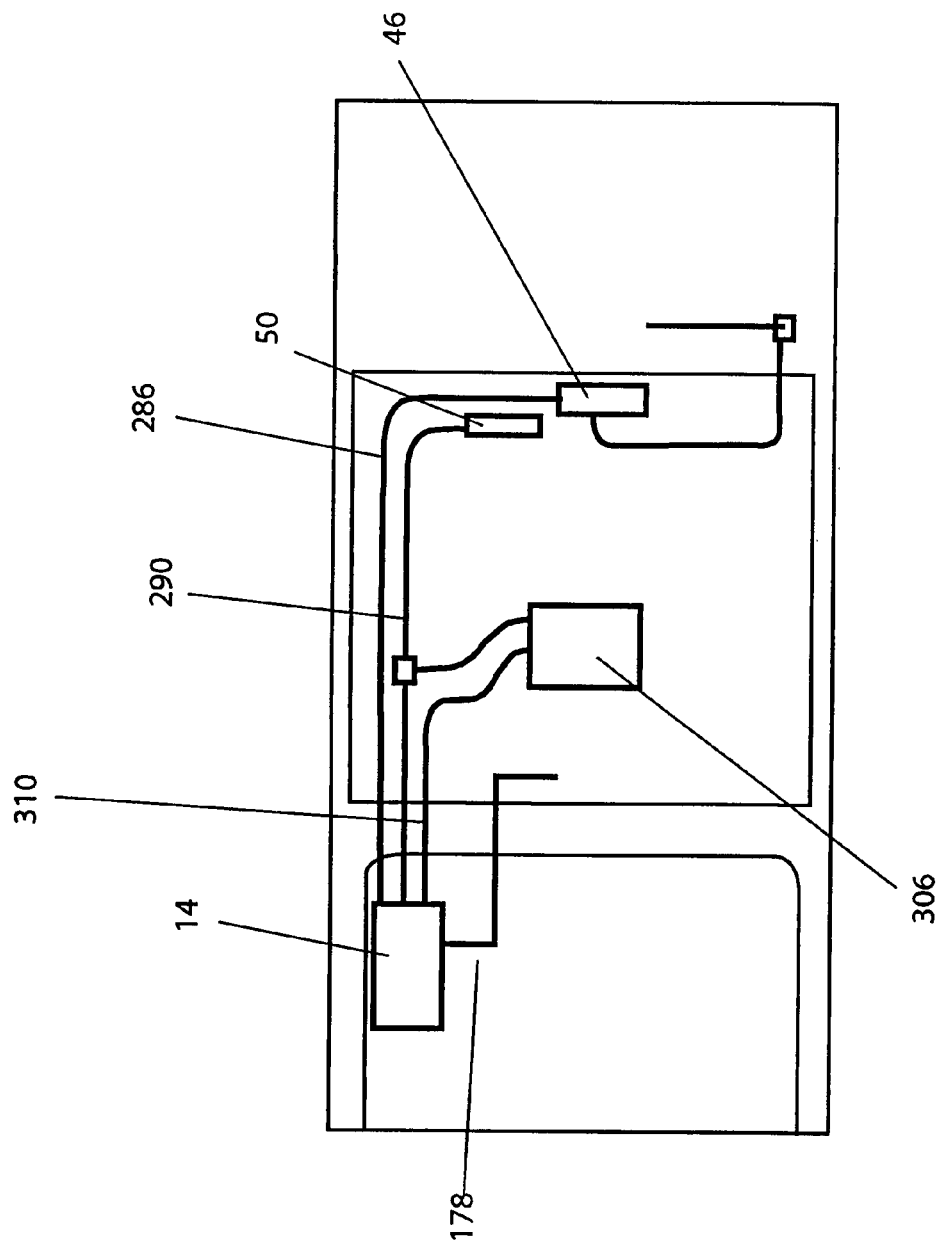
FIG. 18. illustrates an exemplary storage and playback system with an audio/visual media player.

In an alternative embodiment, the control interface is integrated into a head unit 302, shown in FIG. 17, mounted in the dashboard similarly to existing car stereo 46 head unit devices. Referring now to FIG. 18, the head unit 302 is connected to the storage and datalink unit 14 via the analog audio 286 cable and a serial communication standard RS-232 data cable 290, which sends and receives control messages. Head unit 302 provides all of the functions of existing automobile stereo head units, but with the additional capability of providing the interface to the storage and playback system 10, as described above. The head unit 302 is also connected to the car's AM/FM antenna 48 via an antenna cable. The head unit 302 includes a stereo sound processor, audio mixer, pre-amplifier, amplifier, AM/FM (radio) tuner, and a user interface to control the content and other features. The radio tuner is included in the device so that the storage and playback system 10 can play conventional broadcast radio audio. The user switches between content sources by activating the source button. The LCD will also show metadata that may be embedded in the music files themselves. A tag button 78 is included.

The storage gateway system's connection to the Internet can be any Internet connection means such as conventional phone line modem dial-up, a DSL connection, or a fixed wireless broadband connection, such as that provided by Sprint.

The mass storage memory in the storage and playback system 10 can include flash memory, which can be designed as all non-removable, partially removable, or totally removable. Non-removable flash memory is comprised of flash memory chips that are permanently soldered to printed circuit boards located internal to the storage and datalink unit 14 housing. Removable flash memory is used in the form of removable memory cards, such as Compact Flash memory cards, a well known standard for removable flash memory.

In an alternative embodiment, the head unit further includes a CD drive or audiocassette drive so that the storage and playback system 10 can include certain common car stereo functionality. Through the inclusion of a CD drive or audiocassette drive, a user would be able to both listen to downloaded music content from his/her PC 18, and listen to music content that is played off a CD or tape cassette.

In an alternative embodiment, a system is created that can support transfer and presentation of data other than music file data content, such as text and image files, video files, or interactive multimedia files, can be downloaded to the storage and playback system 10 where they are displayed on a high-resolution graphics LCD. Through this application the user can send information, such as driving directions, maps, or movies, to the storage and playback system 10 and thus has access to that information while he/she is in the car.

In the case of movies, such as MPEG files, car passengers can watch video entertainment while traveling. Thus the storage and playback system 10 would include one or more larger video display units, as well as alternative audio output interfaces. For example, the driver can listen to broadcast radio while passengers in the back seat watch an MPEG movie, listening to the movie audio using stereo headphones.

In a further embodiment the storage and playback system 10 can be used as a gateway for transferring data to other computing devices or electronic appliances located in the car. A data link, in the form of electrical wires or cables is used to connect the storage and playback system 10 to other devices in the car. Through this application, users can transfer a host of information easily between their vehicle and home computer. Examples of this application include: transferring records of mileage, speed, and fuel consumption back to a home PC 18; uploading new software or code into a car's central computing controller to improve performance or change settings (these changes could be released by automobile manufacturers over the Internet); downloading map databases into the storage and playback system 10 for navigational use. For this embodiment the communication link that is local to the automobile is extended to the automobile's on-board control computer. An RS-232 port on the storage and datalink unit 14 is connected to a corresponding RS-232 port on the on-board computer. New firmware is downloaded that is of a compatible format for the on-board controller. Reprogramming of automobile operational parameters is performed now. Dinan Engineering provides engine controller firmware upgrades for BMW automobiles that provides improved performance and efficiency. Furthermore, BMWs have certain features that are reprogrammable at a BMW dealership. For example, BMWs can be programmed to automatically lock all doors a few seconds after the automobile is in motion after occupants have entered the car. This feature can be activated or de-activated, depending on the preference of the user with the use of a dedicated automobile feature programming application that runs on the home PC 18.

In a further embodiment, the storage and playback system 10 can be used to transfer audio voice files from the home PC 18 to the car and from the car to the home PC 18. In this embodiment, the storage and playback system 10 head unit further includes a microphone that is used to capture voice recordings that are then stored in memory. Examples of this application include: recording messages for oneself that can later be transferred to and stored on a home PC 18; recording messages for oneself at the home PC 18 (such as street directions) and then storing them on the storage and playback system 10 for use when driving. A microphone mounted near the driver seat is wired to an A/D converter and a DSP subsystem included in the storage and datalink unit 14. An aspect of control firmware on the storage and datalink unit 14 allows the user to trigger a recording function and the user's voice is encoded by the data and storage link unit and stored until the automobile is in range of the home wireless LAN 34, when it is transferred to the home PC 18 automatically.

In another embodiment, the storage and datalink unit 14 is designed such that the battery and wireless LAN transceiver are integrated into the dock 126, and the processing components (including the USB connector) of the storage and datalink unit 14 are internal to the removable part of the storage and datalink unit 14. The wireless LAN transceiver 114 and battery 122 remain in the car so that the weight of the removable part of the storage and datalink unit 14 is minimized. The user carries the device to a home dock, identical in form to the automobile dock 126, which is connected via USB to the PC 18 or storage gateway system. The home dock also provides power to the storage and datalink unit 14. When the storage and datalink unit 14 is in the home dock, synchronization takes place.

A further related embodiment includes a removable storage and datalink unit 14 where local battery 122 remains in the trunk (integral to the dock 126) but the wireless LAN transceiver 114 is included in the storage and datalink unit 14. A home dock that is powered with an AC connection is provided. The home dock converts AC from the wall into DC that can be used to power the computer and wireless LAN transceiver 114 in the removable storage and datalink unit 14. This home dock can be located anywhere within range of the home wireless LAN 34, for example, near the entrance to the home. The removable storage and datalink unit 14 is placed into the home dock, the storage and datalink unit 14 receives power and immediately connects to the home LAN 34, and replication or synchronization commences.

FIG. 18 shows an aftermarket storage and playback system 10 that is a media player with an audio/video display unit 306 that connects to the storage and datalink unit 14 via an RS-232 data cable 290 and an analog audio/video cable 310, and is used in the passenger compartment to control and view content 234 that is stored on the hard disk drive 112.

Figure 19:
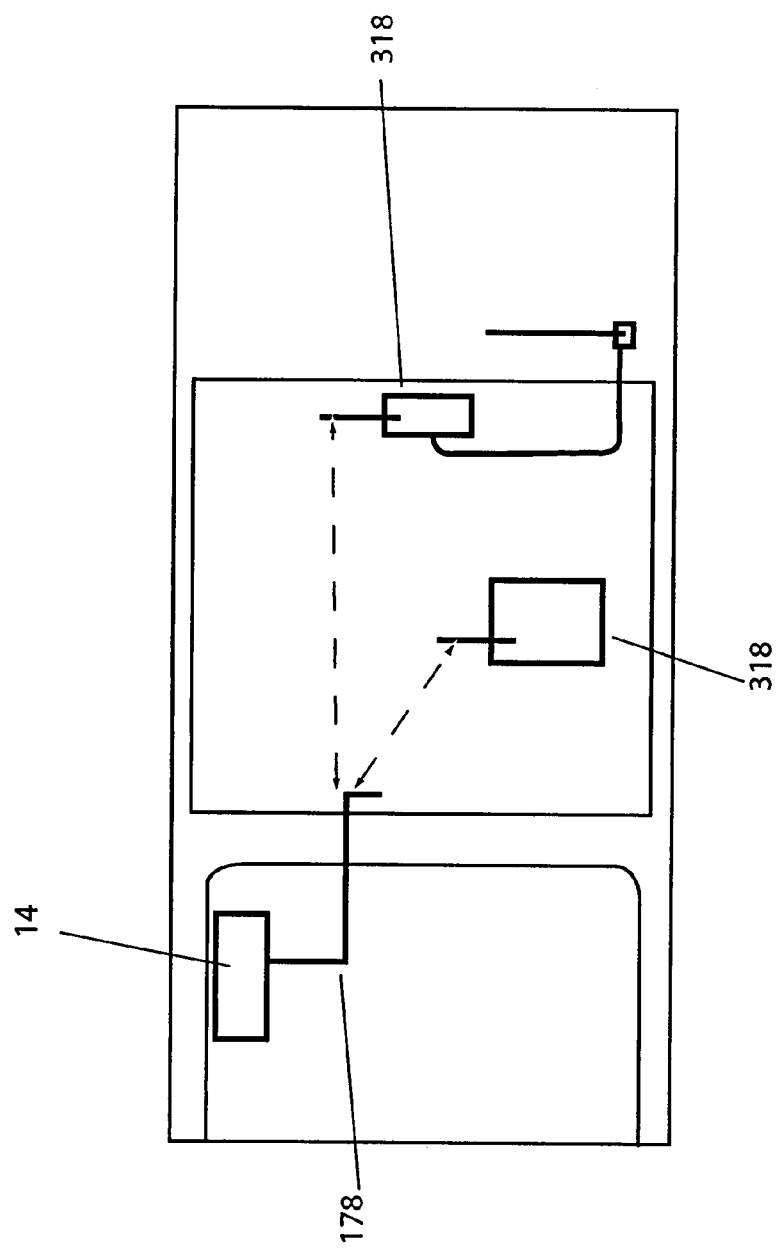
FIG. 19. illustrates a schematic of an exemplary wireless media server system located in an automobile.

In another embodiment, shown in FIG. 19, data is transferred from the storage and datalink unit 14 to a wireless media player unit 318 wirelessly. The storage and datalink unit 14 acts as a storage gateway and a server to the wireless head units 318. System control application operates on storage and datalink unit 14. Each media player unit 318 contains a wireless LAN transceiver connected to an antenna, which allows signals to be received from the storage and datalink unit's 14 wireless transceiver. The storage and datalink unit 14 contains data wirelessly transferred from the home PC 18 and Internet and stored in the hard disk drive 112, and the head units 318 can access that data from the storage and datalink unit 14 wirelessly. Thus, an MP3 song or other audio stored in the storage and datalink unit 14 hard disk drive 112 can be sent wirelessly to the car stereo head unit for immediate playback, just as a movie or other multimedia can be sent wirelessly to the wireless media player head unit 318.

Figure 20:
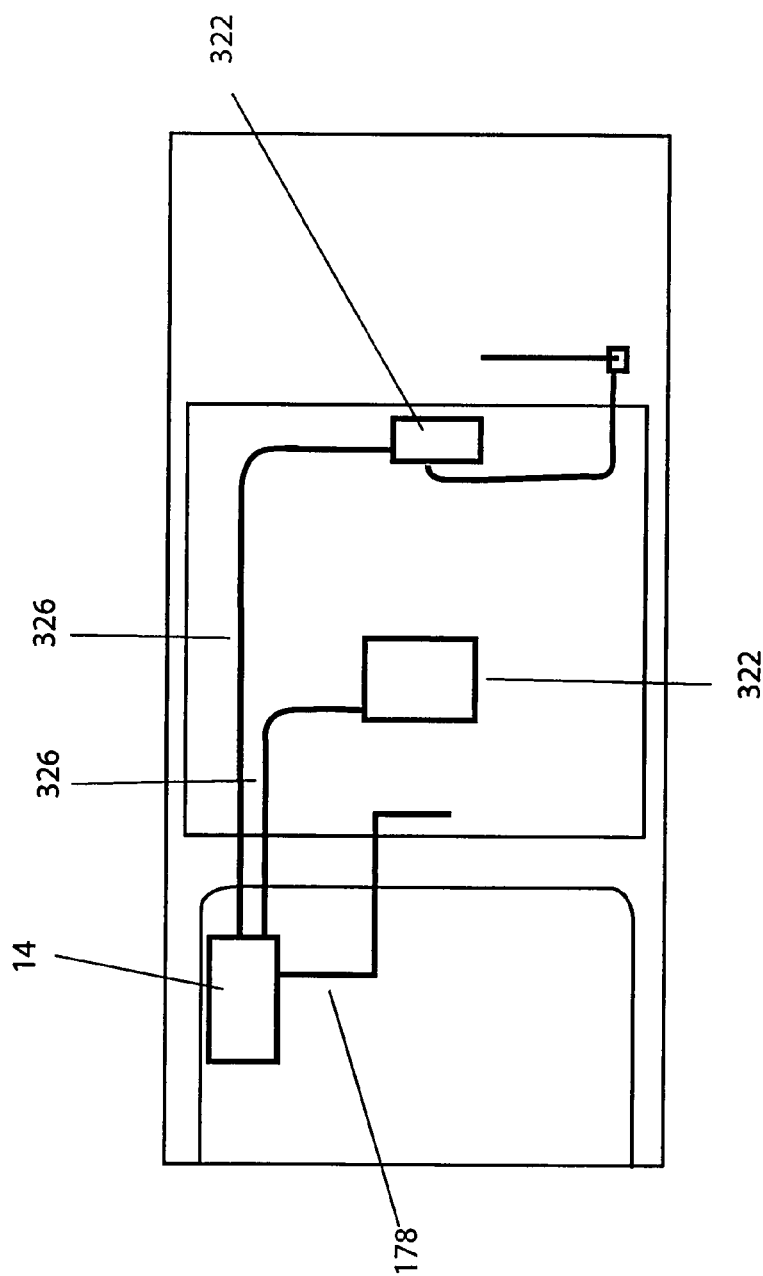
FIG. 20. illustrates a schematic diagram of an exemplary Ethernet-based server system.

In another embodiment, shown in FIG. 20, the storage and datalink unit 14 is connected to the media player head units 322 via a 100 Mbps Ethernet LAN 326 system. The 100 Mbps LAN 326 system can handle multiple audio or video streams from the storage and datalink unit 14 to various head units 322, as well as the control messages.

In another embodiment, data is transferred from the storage and datalink unit 14 to a PDA wirelessly. The storage and datalink unit 14 acts as a storage gateway and server for the PDA. The PDA has a wireless LAN transceiver, which allows signals to be received from the storage and datalink unit 14's wireless transceiver. The storage and datalink unit 14 contains data wirelessly transferred from the home PC 18 and stored in the hard disk drive 112, and that data can be accessed wirelessly by the PDA, for use anywhere in the car or within range of the storage and datalink unit 14. This data could include such content as daily schedules, driving directions and maps, digital movies if the PDA has video decoding and playback capabilities, as well as single or multiplayer games.

Figure 21:
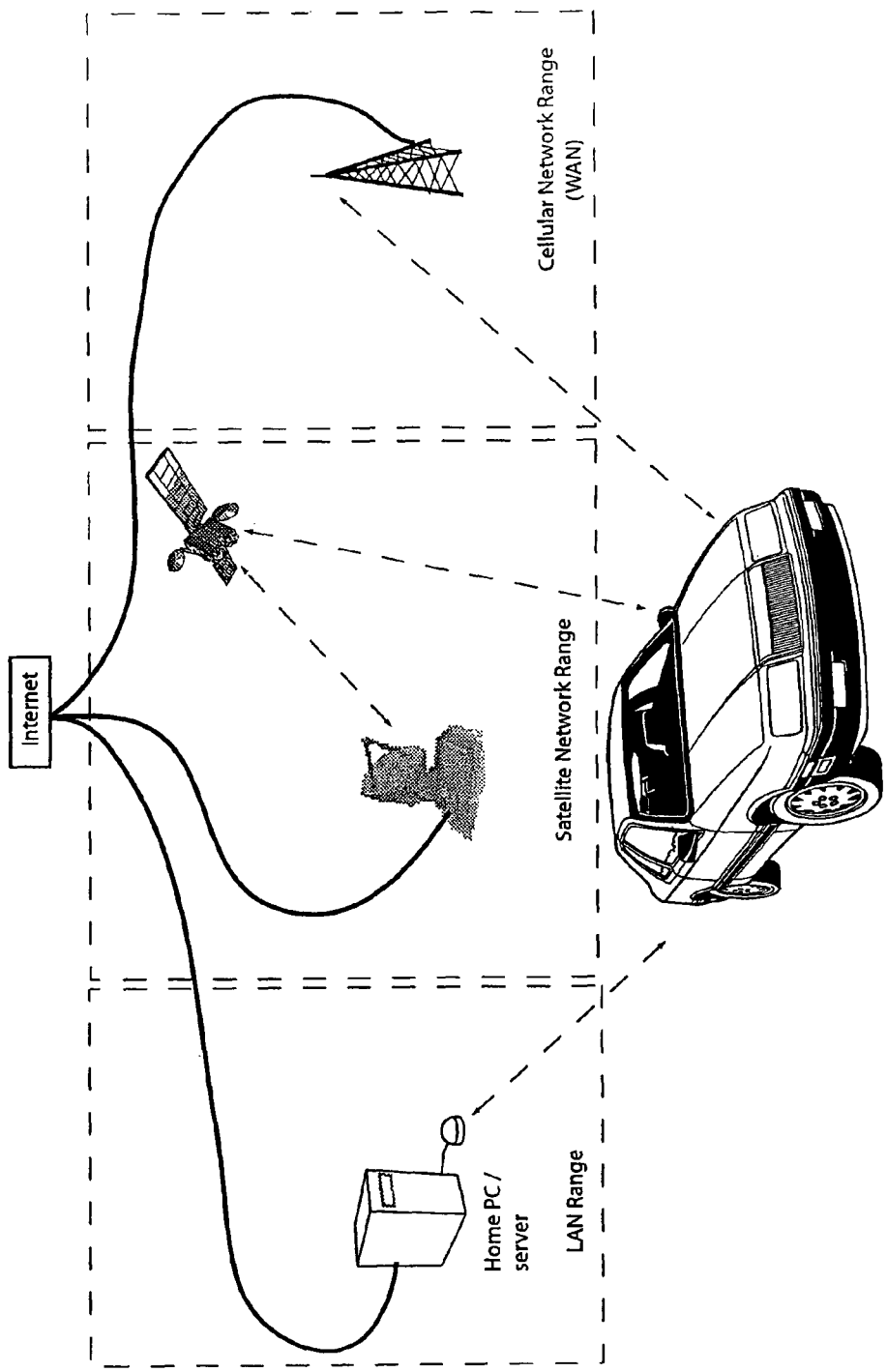
FIG. 21. illustrates an exemplary telematics system with both wireless LAN and wireless WAN communications capabilities.

FIG. 21 shows a block diagram of an automobile with both a wireless LAN transceiver 114 and a wireless WAN transceiver. The user can request and download content regardless of where the automobile is located. However, since WAN bandwidth is more expensive and slower, the WAN content downloads would be limited to narrowband information that is time sensitive, such as traffic updates and messages. The WAN channel can also upload tag messages based on user tag button activations. The tag messages are routed to the corresponding tag processing server.

In this embodiment, the WAN (cellular) chipset is located in the storage and datalink unit 14. A separate antenna is used and also connected to the WAN radio input. The operating system on the storage and datalink unit 14 includes software that monitors and controls the WAN subsystem, receiving and recording content, and sending content (messages) or connecting to the cellular system for real-time voice transmission.

A storage and playback device and a method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A method comprising:
   receiving media content at a media playback device, wherein the media content includes data associated with the media content, and wherein the data associated with the media content is separate from the media content and indicates a characteristic of the media content;
   during rendering of the media content, accepting a tag selected by a user, wherein the tag is added to the data associated with the media content; and
   transferring the data associated with the media content, including the tag, to a server on an associated network designated by the media playback device upon detection of a connection to the associated network,
   wherein the tag is configured to be transferred to a tag aggregation page at the server; and
   wherein two different battery sources are configured to be used to power the media playback device.

2. The method of claim 1, wherein the associated network comprises a local area network (LAN) coupled to the Internet, and wherein the server is configured to present the information related to the data associated with the media content via a web site.

3. The method of claim 2, wherein the transferring the data associated with the media content comprises transferring the data associated with the media content from the memory component to an Internet gateway device over the LAN, and wherein the Internet gateway device is configured to communicate with the personal device.

4. The method of claim 3, wherein the transferring the data associated with the media content from the memory device to the Internet gateway device is initiated in response to the media playback device coming into range of the LAN.

5. The method of claim 3, wherein the transferring the data associated with the media content from the memory component to the Internet gateway device is automatically initiated in response to the media playback device coming into range of the LAN.

6. The method of claim 1, wherein the data associated with the media content comprises metadata embedded within the media content.

7. The method of claim 1, wherein the media content comprises broadcast radio content, and wherein the data associated with the media content comprises a radio tuner frequency and a time and date during which the media content is being rendered by the media playback system.

8. The method of claim 1, wherein one of the two different battery sources is an alternate battery coupled to a docking station in an automobile, and wherein the media playback device is configured for coupling and decoupling with the automobile via the docking station.

9. The method of claim 1, further comprising receiving a user input at the media playback device to cause the data associated with the media content to be stored in the memory component associated with the media playback device.

10. The method of claim 1, wherein the media playback device is a mobile device.

11. The method of claim 1, further comprising:
    storing the data associated with the media content in a memory component associated with the media playback device; and
    storing the tag in the memory component as part of the data associated with the media content.

12. The method of claim 1, wherein the two different battery sources comprise:
    automobile battery power when an automobile associated with the media playback device is in operation; and
    an alternate battery linked to the media playback device when the automobile is not in operation.

13. A media playback system comprising:
    a receiver configured to receive media content, wherein the media content includes data associated with the media content, and wherein the data associated with the media content indicates a characteristic of the media content;
    a memory component; and a processing unit coupled to the receiver and the memory component, wherein the processing unit is configured to:
  during rendering of the media content, accepting a tag selected by a user, wherein the tag is added to the data associated with the media content; and
  transfer the data associated with the media content, including the tag, to a server on an associated network designated by the media playback device, wherein the tag is configured to be transferred to a tag aggregation page at the server; and
  wherein two different battery sources are configured to be used to power the media playback device.

14. The media playback system of claim 13, wherein the associated network comprises the Internet, and wherein the server is configured to present the information related to the data associated with the media content via a web site.

15. The media playback system of claim 14, wherein the transferring the data associated with the media content comprises transferring the data associated with the media content from the memory component to an Internet gateway device over a local area network (LAN), and wherein the Internet gateway device is configured to communicate with the personal device.

16. The media playback system of claim 15, wherein the transferring the data associated with the media content from the memory component to the Internet gateway device is initiated in response to the media playback system coming in range of the local area network.

17. The media playback system of claim 15, wherein the transfer of data associated with the media content from the memory component to the Internet gateway device is automatically initiated in response to the media playback system coming into range of the LAN.

18. The media playback system of claim 13, wherein the data associated with the media content comprises metadata embedded within the media content.

19. The media playback system of claim 13, wherein the media content comprises broadcast radio content, and wherein the data associated with the media content comprises a radio tuner frequency and a time and date during which the media content is being rendered by the media playback system.

20. The media playback system of claim 13, wherein one of the two different battery sources is an alternate battery linked to the media playback system wherein the alternate battery is coupled to a docking station in an automobile, and wherein the media playback device is configured for coupling and decoupling with the automobile via the docking station.

21. The media playback system of claim 13, further comprising a user interface configured to receive a user input to cause the data associated with the media content to be stored in the memory component associated with the media playback system.

22. The media playback system of claim 13, wherein the media playback system is a mobile device.

23. A non-transitory computer-readable medium having instructions stored thereon that, upon execution by a processor, cause the processor to perform operations comprising:
  receiving media content at a media playback device, wherein the media content includes data associated with the media content, and wherein the data associated with the media content indicates a characteristic of the media content;
  during the rendering the media content, accepting a tag selected by a user, wherein the tag is added to the data associated with the media content; and
  transferring the data associated with the media content, including the tag to a server on an associated network designated by the media playback device, wherein the tag is configured to be transferred to a tag aggregation page at the server; and
  wherein two different battery sources are configured to be used to power the media playback device.

24. The non-transitory computer-readable medium of claim 23, wherein the associated network comprises the Internet, and wherein the server is configured to present the information related to the data associated with the media content via a web site.

25. The non-transitory computer-readable medium of claim 24, wherein the transferring the data associated with the media content comprises transferring the data associated with the media content from the memory component to an Internet gateway device over a local area network (LAN), and wherein the Internet gateway device is configured to communicate with the server.

26. The non-transitory computer-readable medium of claim 25, wherein the transferring the data associated with the media content from the memory device to the Internet gateway device is initiated in response to a device that includes the media playback device coming into range of the local area network.

27. The non-transitory computer-readable medium of claim 25, wherein the transferring the data associated with the media content from the memory component to the Internet gateway device is automatically initiated in response to the media playback device coming into range of the LAN.

28. The non-transitory computer-readable medium of claim 23, wherein the data associated with the media content comprises metadata embedded within the media content.

29. The non-transitory computer-readable medium of claim 23, wherein the media content comprises broadcast radio content, and wherein the data associated with the media content comprises a radio tuner frequency and a time and date during which the media content is being rendered.

30. The non-transitory computer-readable medium of claim 23, wherein the wherein one of the two different battery sources is an alternate battery linked to the media playback system and the alternate battery is coupled to a docking station in an automobile, and wherein the media playback device is configured for coupling and decoupling with the automobile via the docking station.

31. The non-transitory computer-readable medium of claim 23, wherein the operations further comprise receiving a user input to cause the data associated with the media content to be stored in the memory component associated with the media playback device.

32. The non-transitory computer-readable medium of claim 23, wherein the media playback device is a mobile device.

* * * * *